United States Patent
Green et al.

(10) Patent No.: US 11,362,582 B2
(45) Date of Patent: Jun. 14, 2022

(54) MULTI-PHASE CONVERTER CONTROL SYSTEM AND METHOD FOR INTERLEAVING MULTI-PHASE CONVERTERS

(71) Applicant: Emerson Climate Technologies, Inc., Sidney, OH (US)

(72) Inventors: Charles E. Green, Fenton, MO (US); Paul Rancuret, St. Louis, MO (US)

(73) Assignee: Emerson Climate Technologies, Inc., Sidney, OH (US)

( * ) Notice: Subject to any disclaimer, the term of this patent is extended or adjusted under 35 U.S.C. 154(b) by 6 days.

(21) Appl. No.: 16/938,219

(22) Filed: Jul. 24, 2020

(65) Prior Publication Data

US 2021/0028692 A1 Jan. 28, 2021

Related U.S. Application Data

(60) Provisional application No. 62/879,162, filed on Jul. 26, 2019.

(51) Int. Cl.
*H02M 1/42* (2007.01)
*H02M 1/38* (2007.01)
(Continued)

(52) U.S. Cl.
CPC .......... *H02M 1/4208* (2013.01); *H02M 1/38* (2013.01); *H02M 1/0009* (2021.05); *H02M 1/32* (2013.01); *H02M 1/44* (2013.01); *H02P 27/06* (2013.01)

(58) Field of Classification Search
CPC ........ H02M 1/0009; H02M 1/32; H02M 1/38; H02M 1/4208; H02M 1/44; H02P 27/06
(Continued)

(56) References Cited

U.S. PATENT DOCUMENTS

| 8,264,860 B2 * | 9/2012 | Green | H02M 1/4208 |
| | | | 363/41 |
| 8,330,441 B1 | 12/2012 | Klumpp | |

(Continued)

FOREIGN PATENT DOCUMENTS

KR 20170080518 A 7/2017

OTHER PUBLICATIONS

International Search Report and Written Opinion for International Application No. PCT/US2020/043634 dated Nov. 10, 2020.

*Primary Examiner* — Yemane Mehari
(74) *Attorney, Agent, or Firm* — Harness, Dickey & Pierce, P.L.C.

(57) ABSTRACT

A desired OFF period module is configured to determine a desired OFF period for a plurality of switches of a PFC circuit based on an input voltage and an output voltage. A blanking timer module is configured to output a blanking signal, set the blanking signal to a first state when a countdown timer is greater than zero, and set the blanking signal to a second state when the countdown timer reaches zero. A switching control module is configured to: transition a first switch of the plurality of switches from an ON state to an OFF state in response to (i) a measured current through an inductor of the PFC circuit being greater than a demanded current through the inductor and (ii) the blanking signal being in the second state; and maintain the first switch in the OFF state for the desired OFF period after the transition.

20 Claims, 23 Drawing Sheets

(51) Int. Cl.
    *H02P 27/06*    (2006.01)
    *H02M 1/32*     (2007.01)
    *H02M 1/44*     (2007.01)
    *H02M 1/00*     (2006.01)

(58) Field of Classification Search
    USPC .......................................................... 323/210
    See application file for complete search history.

(56) References Cited

U.S. PATENT DOCUMENTS

| | | |
|---|---|---|
| 8,344,712 B2 | 1/2013 | Martin et al. |
| 9,933,842 B2 | 4/2018 | Green et al. |
| 10,277,115 B2 | 4/2019 | Green |
| 10,312,798 B2 | 6/2019 | Green et al. |
| 10,763,740 B2 | 9/2020 | Green |
| 2016/0233759 A1* | 8/2016 | Colbeck .................. H02M 1/42 |
| 2016/0309418 A1 | 10/2016 | Sedzin et al. |
| 2017/0302158 A1* | 10/2017 | Green ..................... H02M 1/12 |
| 2017/0302165 A1* | 10/2017 | Marcinkiewicz ....... H02M 7/06 |
| 2018/0224922 A1* | 8/2018 | Green ................. G06F 13/4022 |
| 2019/0029086 A1 | 1/2019 | Wang |
| 2021/0028692 A1* | 1/2021 | Green ..................... H02P 23/26 |

* cited by examiner

MULTI-PHASE CONVERTER CONTROL SYSTEM AND METHOD FOR INTERLEAVING MULTI-PHASE CONVERTERS

CROSS-REFERENCE TO RELATED APPLICATIONS

This application claims the benefit of U.S. Provisional Application No. 62/879,162, filed on 26 Jul. 2019. The entire disclosure of the application referenced above is incorporated herein by reference.

FIELD

The present disclosure relates to a voltage converters and, more particularly, to systems and methods controlling switching of voltage converters.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electric motors are used in a wide variety of industrial and residential applications including, but not limited to, heating, ventilating, and air conditioning (HVAC) systems. For example only, an electric motor may drive a compressor in an HVAC system. One or more additional electric motors may also be implemented in the HVAC system. For example only, the HVAC system may include another electric motor that drives a fan associated with a condenser. Another electric motor may be included in the HVAC system to drive a fan associated with an evaporator.

SUMMARY

In a feature, a power factor correction (PFC) system includes: a desired OFF period module configured to determine a desired OFF period for a plurality of switches of a PFC circuit based on an input voltage to the PFC circuit and an output voltage of the PFC circuit; a blanking timer module configured to output a blanking signal, to set the blanking signal to a first state when a countdown timer is greater than zero, and to set the blanking signal to a second state when the countdown timer reaches zero; and a switching control module configured to: transition a first switch of the plurality of switches from an ON state to an OFF state in response to (i) a measured current through an inductor of the PFC circuit being greater than a demanded current through the inductor and (ii) the blanking signal being in the second state; and maintain the first switch of the plurality of switches in the OFF state for at least the desired OFF period after the transition from the ON state to the OFF state.

In further features, the desired OFF period module is configured to set the desired OFF period using one of: (i) an equation that relates input voltages and output voltages to desired OFF periods; and (ii) a look-up table that relates input voltages and output voltages to desired OFF periods.

In further features, the desired OFF period module is configured to set the desired OFF period using the equation: $DOP = t_p * v_i / V_O$, where DOP is the desired OFF period, $t_p$ is a predetermined switching period, $v_i$ is the input voltage, and $v_o$ is the output voltage.

In further features, a first timer module is configured to output a first time representative of a first period that the first switch of the plurality of switches has been in the OFF state, where: the switching control module is configured to: determine a maximum off period for the first switch of the plurality of switches based on an OFF period of a converter leg associated with the first switch of the plurality of switches, and in response to determining that the first time is greater than or equal to (i) the desired OFF period and (ii) the maximum off period, transition the first switch of the plurality of switches from the OFF state to the ON state.

In further features, a second timer module is configured to output a second time representative of a second period that has passed since a second switch of the plurality of switches was transitioned from the OFF state to the ON state, where the switching control module is configured to: determine a threshold value associated with the second switch of the plurality of switches based on the OFF period of the converter leg, and in response to determining that (i) the first time is greater than or equal to the desired OFF period and (ii) the second time is greater than or equal to the determined threshold value, transition the first switch of the plurality of switches from the OFF state to the ON state.

In further features, the switching control module is configured to, in response to transitioning the first switch of the plurality of switches from the ON state to the OFF state, delay for a predetermined dead time and, once the predetermined dead time has passed, transition a third switch of the plurality of switches from the OFF state to the ON state.

In further features, transitioning the first switch of the plurality of switches from the OFF state to the ON state includes: transitioning a third switch of the plurality of switches from the ON state to the OFF state; and delaying for the predetermined dead time, after the predetermined dead time has passed, transitioning the first switch of the plurality of switches from the OFF state to the ON state.

In further features, the blanking timer module is configured to reset the countdown timer in response to one of: the first switch of the plurality of switches transitioning from the ON state to the OFF state; and the second switch of the plurality of switches transitioning from the ON state to the OFF state.

In further features, the switching control module is configured to, in response to the measured current through the inductor of the PFC circuit being greater than the demanded current through the inductor, store the first time output by the first timer module as the OFF period of the converter leg.

In further features, the desired OFF period module is configured to determine the desired OFF period based on a switching period associated with the first switch of the plurality of switches.

In a feature, a power factor correction (PFC) method includes: determining a desired OFF period for a plurality of switches of a PFC circuit based on an input voltage to the PFC circuit and an output voltage of the PFC circuit; outputting a blanking signal; setting the blanking signal to a first state when a countdown timer is greater than zero; setting the blanking signal to a second state when the countdown timer reaches zero; transitioning a first switch of the plurality of switches from an ON state to an OFF state in response to (i) a measured current through an inductor of the PFC circuit being greater than a demanded current through the inductor and (ii) the blanking signal being in the second state; and maintaining the first switch of the plurality of switches in the OFF state for at least the desired OFF period after the transition from the ON state to the OFF state.

In further features, setting the desired OFF period includes setting the desired OFF period using one of: (i) an equation that relates input voltages and output voltages to desired OFF periods; and (ii) a look-up table that relates input voltages and output voltages to desired OFF periods.

In further features, setting the desired OFF period includes setting the desired OFF period using the equation:

$$DOP = t_p * \frac{V_I}{V_O},$$

where DOP is the desired OFF period, $t_p$ is a predetermined switching period, $v_i$ is the input voltage, and $v_o$ is the output voltage.

In further features, the PFC method further includes: outputting a first time representative of a first period that the first switch of the plurality of switches has been in the OFF state; determining a maximum off period for the first switch of the plurality of switches based on an OFF period of a converter leg associated with the first switch of the plurality of switches; and in response to determining that the first time is greater than or equal to (i) the desired OFF period and (ii) the maximum off period, transitioning the first switch of the plurality of switches from the OFF state to the ON state.

In further features, the PFC method further includes: outputting a second time that represents a second period that has passed since a second switch of the plurality of switches was transitioned from the OFF state to the ON state; determining a threshold value associated with the second switch of the plurality of switches based on the OFF period of the converter leg; and in response to determining that (i) the first time is greater than or equal to the desired OFF period and (ii) the second time is greater than or equal to the determined threshold value, transitioning the first switch of the plurality of switches from the OFF state to the ON state.

In further features, the PFC method further includes, in response to transitioning the first switch of the plurality of switches from the ON state to the OFF state, delaying for a predetermined dead time and, once the predetermined dead time has passed, transitioning a third switch of the plurality of switches from the OFF state to the ON state.

In further features, transitioning the first switch of the plurality of switches from the OFF state to the ON state includes: transitioning a third switch of the plurality of switches from the ON state to the OFF state; and delaying for the predetermined dead time, after the predetermined dead time has passed, transitioning the first switch of the plurality of switches from the OFF state to the ON state.

In further features, the PFC method further includes resetting the countdown timer in response to one of: the first switch of the plurality of switches transitioning from the ON state to the OFF state; and the second switch of the plurality of switches transitioning from the ON state to the OFF state.

In further features, the PFC method further includes, in response to the measured current through the inductor of the PFC circuit being greater than the demanded current through the inductor, storing the first time output as the OFF period of the converter leg.

In further features, the PFC method further includes determining the desired OFF period based on a switching period associated with the first switch of the plurality of switches. Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Refrigeration System

Figure 1:
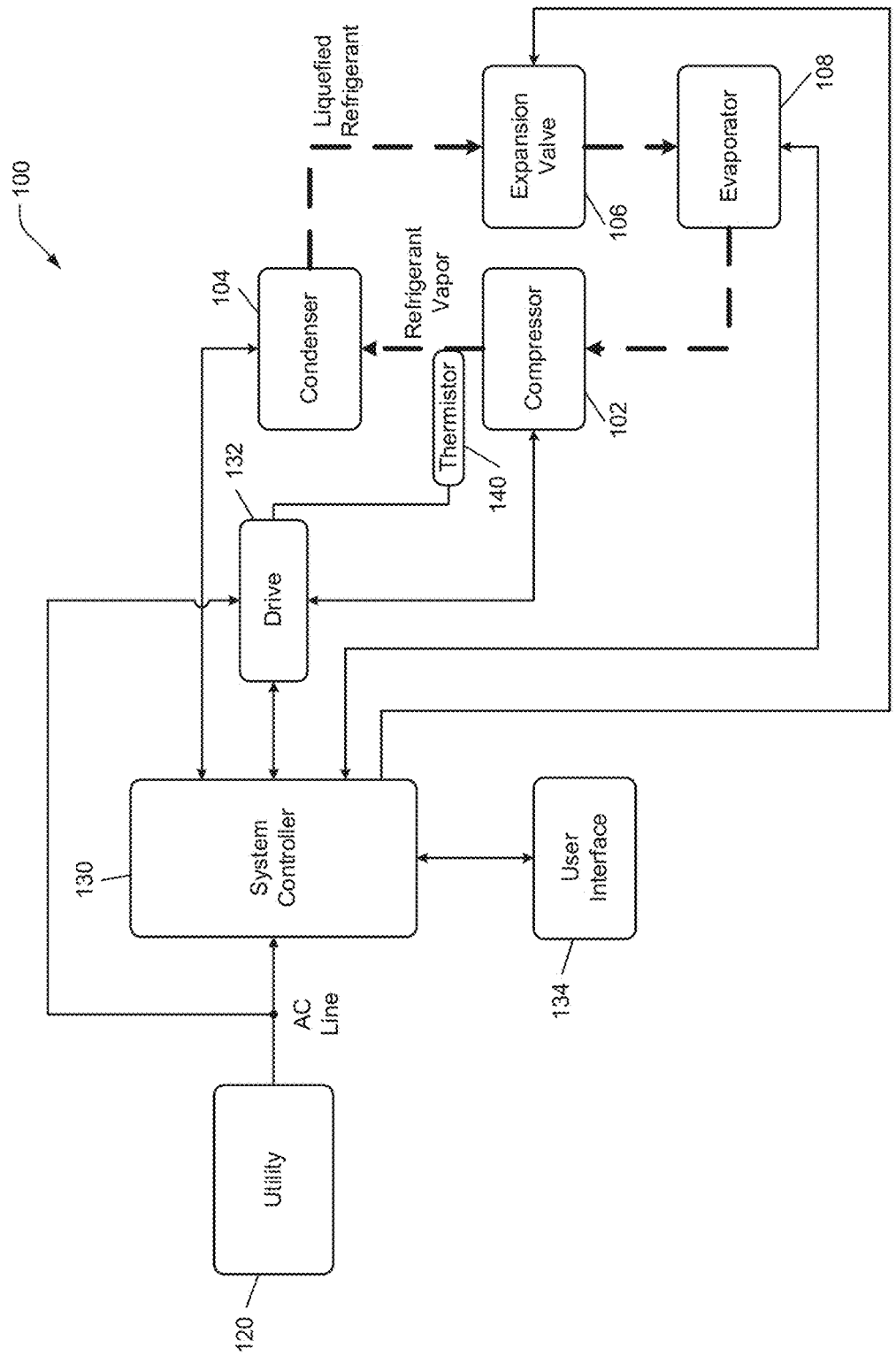
FIG. 1 is a functional block diagram of an example refrigeration system.

FIG. 1 is a functional block diagram of an example refrigeration system 100 including a compressor 102, a condenser 104, an expansion valve 106, and an evaporator 108. According to the principles of the present disclosure, the refrigeration system 100 may include additional and/or alternative components, such as a reversing valve or a filter-drier. In addition, the present disclosure is applicable to other types of refrigeration systems including, but not limited to, heating, ventilating, and air conditioning (HVAC), heat pump, refrigeration, and chiller systems.

The compressor 102 receives refrigerant in vapor form and compresses the refrigerant. The compressor 102 provides pressurized refrigerant in vapor form to the condenser 104. The compressor 102 includes an electric motor that drives a pump. For example only, the pump of the compressor 102 may include a scroll compressor and/or a reciprocating compressor.

All or a portion of the pressurized refrigerant is converted into liquid form within the condenser 104. The condenser 104 transfers heat away from the refrigerant, thereby cooling the refrigerant. When the refrigerant vapor is cooled to a temperature that is less than a saturation temperature, the refrigerant transforms into a liquid (or liquefied) refrigerant. The condenser 104 may include an electric fan that increases the rate of heat transfer away from the refrigerant.

The condenser 104 provides the refrigerant to the evaporator 108 via the expansion valve 106. The expansion valve 106 controls the flow rate at which the refrigerant is supplied to the evaporator 108. The expansion valve 106 may include a thermostatic expansion valve or may be controlled electronically by, for example, a system controller 130. A pressure drop caused by the expansion valve 106 may cause a portion of the liquefied refrigerant to transform back into the vapor form. In this manner, the evaporator 108 may receive a mixture of refrigerant vapor and liquefied refrigerant.

The refrigerant absorbs heat in the evaporator 108. Liquid refrigerant transitions into vapor form when warmed to a temperature that is greater than the saturation temperature of the refrigerant. The evaporator 108 may include an electric fan that increases the rate of heat transfer to the refrigerant.

A utility 120 provides power to the refrigeration system 100. For example only, the utility 120 may provide single-phase alternating current (AC) power at approximately 230 Volts root mean squared ($V_{RMS}$). In other implementations, the utility 120 may provide three-phase AC power at approximately 400 $V_{RMS}$, 480 $V_{RMS}$, or 600 $V_{RMS}$ at a line frequency of, for example, 50 or 60 Hz. When the three-phase AC power is nominally 600 $V_{RMS}$, the actual available voltage of the power may be 575 $V_{RMS}$.

The utility 120 may provide the AC power to the system controller 130 via an AC line, which includes two or more conductors. The AC power may also be provided to a drive 132 via the AC line. The system controller 130 controls the refrigeration system 100. For example only, the system controller 130 may control the refrigeration system 100 based on user inputs and/or parameters measured by various sensors (not shown). The sensors may include pressure sensors, temperature sensors, current sensors, voltage sensors, etc. The sensors may also include feedback information from the drive control, such as motor currents or torque, over a serial data bus or other suitable data buses.

A user interface 134 provides user inputs to the system controller 130. The user interface 134 may additionally or alternatively provide the user inputs directly to the drive 132. The user inputs may include, for example, a desired temperature, requests regarding operation of a fan (e.g., a request for continuous operation of the evaporator fan), and/or other suitable inputs. The user interface 134 may take the form of a thermostat, and some or all functions of the system controller (including, for example, actuating a heat source) may be incorporated into the thermostat.

The system controller 130 may control operation of the fan of the condenser 104, the fan of the evaporator 108, and the expansion valve 106. The drive 132 may control the compressor 102 based on commands from the system controller 130. For example only, the system controller 130 may instruct the drive 132 to operate the motor of the compressor 102 at a certain speed or to operate the compressor 102 at a certain capacity. In various implementations, the drive 132 may also control the condenser fan.

A thermistor 140 is thermally coupled to the refrigerant line exiting the compressor 102 that conveys refrigerant vapor to the condenser 104. The variable resistance of the thermistor 140 therefore varies with the discharge line temperature (DLT) of the compressor 102. As described in more detail, the drive 132 monitors the resistance of the thermistor 140 to determine the temperature of the refrigerant exiting the compressor 102.

The DLT may be used to control the compressor 102, such as by varying capacity of the compressor 102, and may also be used to detect a fault. For example, if the DLT exceeds the threshold, the drive 132 may power down the compressor 102 to prevent damage to the compressor 102.

Drive

Figure 2:
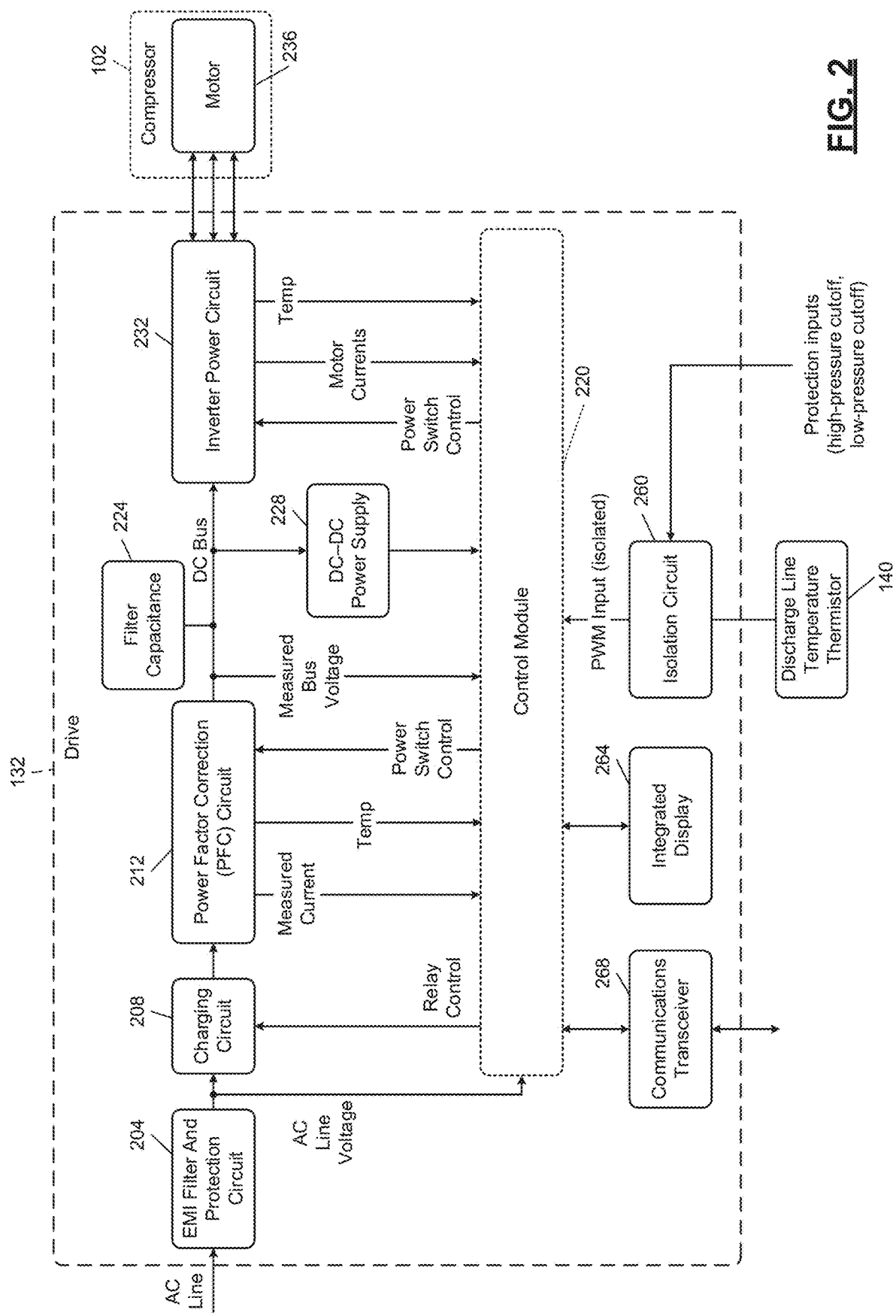
FIG. 2 is a block diagram of an example implementation of the compressor motor drive of FIG. 1.

In FIG. 2, an example implementation of the drive 132 includes an electromagnetic interference (EMI) filter and protection circuit 204, which receives power from an AC line. The EMI filter and protection circuit 204 reduces EMI that might otherwise be injected back onto the AC line from the drive 132. The EMI filter and protection circuit 204 may also remove or reduce EMI arriving from the AC line. Further, the EMI filter and protection circuit 204 protects against power surges, such as may be caused by lightening, and/or other types of power surges and sags.

A charging circuit 208 controls power supplied from the EMI filter and protection circuit 204 to a power factor correction (PFC) circuit 212. For example, when the drive 132 initially powers up, the charging circuit 208 may place a resistance in series between the EMI filter and protection circuit 204 and the PFC circuit 212 to reduce the amount of current inrush. These current or power spikes may cause various components to prematurely fail.

After initial charging is completed, the charging circuit 208 may close a relay that bypasses the current-limiting resistor. For example, a control module 220 may provide a relay control signal to the relay within the charging circuit 208. In various implementations, the control module 220 may assert the relay control signal to bypass the current-limiting resistor after a predetermined period of time following start up, or based on closed loop feedback indicating that charging is near completion.

The PFC circuit 212 converts incoming AC power to DC power. The PFC circuit 212 may not be limited to PFC functionality—for example, the PFC circuit 212 may also perform voltage conversion functions, such as acting as a boost circuit and/or a buck circuit. In some implementations, the PFC circuit 212 may be replaced by a non-PFC voltage converter. The DC power may have voltage ripples, which are reduced by filter capacitance 224. Filter capacitance 224 may include one or more capacitors arranged in parallel and connected to the DC bus. The PFC circuit 212 may attempt to draw current from the AC line in a sinusoidal pattern that matches the sinusoidal pattern of the incoming voltage. As the sinusoids align, the power factor approaches one, which represents the greatest efficiency and the least demanding load on the AC line.

The PFC circuit 212 includes one or more switches that are controlled by the control module 220 using one or more signals labeled as power switch control. The control module 220 determines the power switch control signals based on a measured voltage of the DC bus, measured current in the PFC circuit 212, AC line voltages, temperature or temperatures of the PFC circuit 212, and the state of a power switch in the PFC circuit 212. While the example of use of measured values is provided, the control module 220 may determine the power switch control signals based on an estimated voltage of the DC bus, estimated current in the PFC circuit 212, estimated AC line voltages, estimated temperature or temperatures of the PFC circuit 212, and/or the estimated or expected state of a power switch in the PFC circuit 212. In various implementations, the AC line voltages are measured or estimated subsequent to the EMI filter and protection circuit 204 but prior to the charging circuit 208.

The control module 220 is powered by a DC-DC power supply 228, which provides a voltage suitable for logic of the control module 220, such as 3.3 Volts, 2.5 Volts, etc. The DC-DC power supply 228 may also provide DC power for operating switches of the PFC circuit 212 and an inverter power circuit 232. For example only, this voltage may be a higher voltage than for digital logic, with 15 Volts being one example.

The inverter power circuit 232 also receives power switch control signals from the control module 220. In response to the power switch control signals, switches within the inverter power circuit 232 cause current to flow in respective windings of a motor 236 of the compressor 102. The control module 220 may receive a measurement or estimate of motor current for each winding of the motor 236 or each leg of the inverter power circuit 232. The control module 220 may also receive a temperature indication from the inverter power circuit 232.

For example only, the temperature received from the inverter power circuit 232 and the temperature received from the PFC circuit 212 are used only for fault purposes. In other words, once the temperature exceeds a predetermined threshold, a fault is declared and the drive 132 is either powered down or operated at a reduced capacity. For example, the drive 132 may be operated at a reduced capacity and if the temperature does not decrease at a predetermined rate, the drive 132 transitions to a shutdown state.

The control module 220 may also receive an indication of the discharge line temperature from the compressor 102 using the thermistor 140. An isolation circuit 260 may provide a pulse-width-modulated representation of the resistance of the thermistor 140 to the control module 220. The isolation circuit 260 may include galvanic isolation so that there is no electrical connection between the thermistor 140 and the control module 220.

The isolation circuit 260 may further receive protection inputs indicating faults, such as a high-pressure cutoff or a low-pressure cutoff, where pressure refers to refrigerant pressure. If any of the protection inputs indicate a fault and, in some implementations, if any of the protection inputs become disconnected from the isolation circuit 260, the isolation circuit 260 ceases sending the PWM temperature signal to the control module 220. Therefore, the control module 220 may infer that a protection input has been received from an absence of the PWM signal. The control module 220 may, in response, shut down the drive 132.

The control module 220 controls an integrated display 264, which may include a grid of LEDs and/or a single LED package, which may be a tri-color LED. The control module 220 can provide status information, such as firmware versions, as well as error information using the integrated display 264. The control module 220 communicates with external devices, such as the system controller 130 in FIG. 1, using a communications transceiver 268. For example only, the communications transceiver 268 may conform to the RS-485 or RS-232 serial bus standards or to the Controller Area Network (CAN) bus standard.

PFC Circuit

Figure 3:
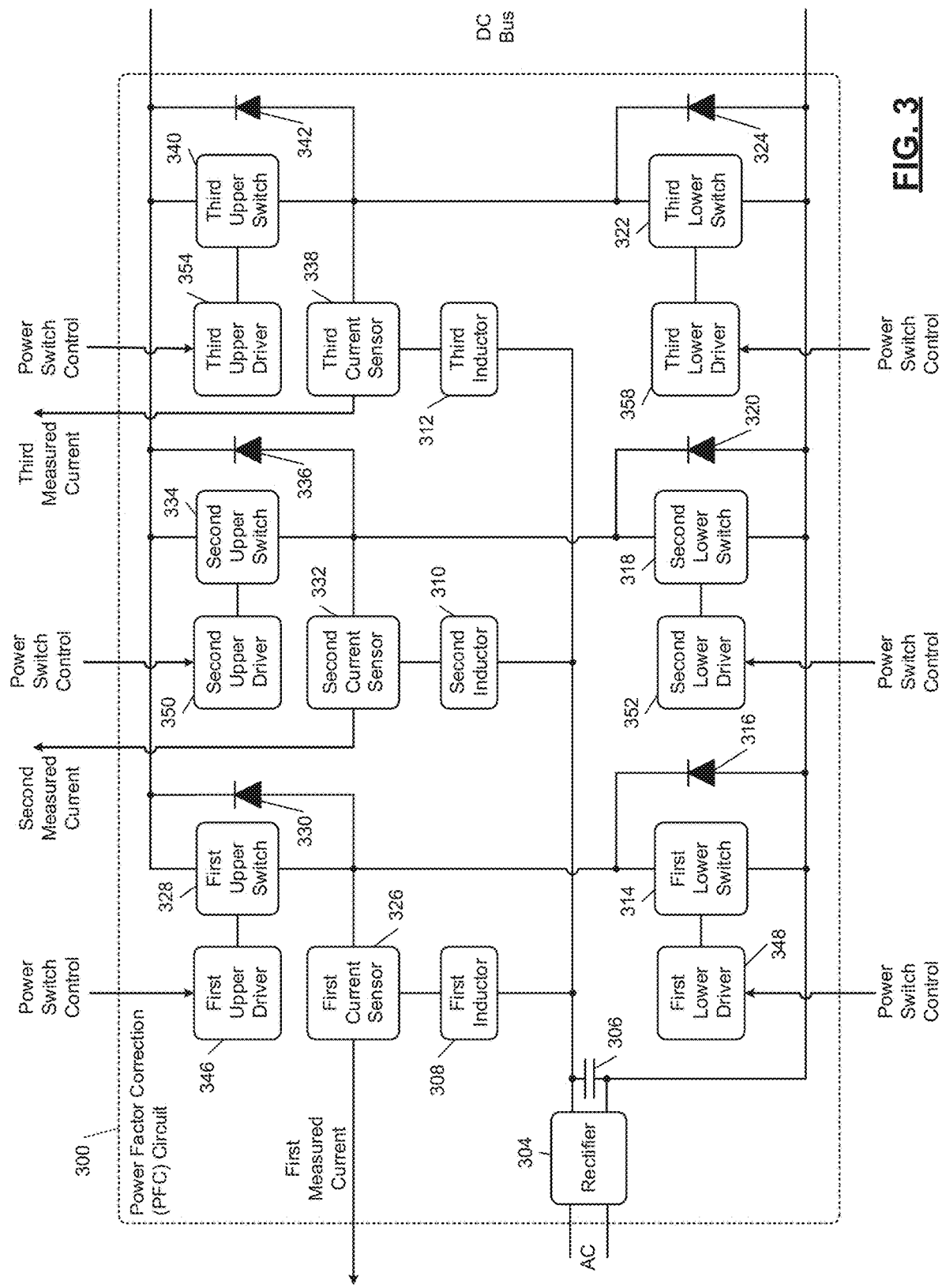
FIG. 3 is a block diagram of an example implementation of the power factor correction (PFC) circuit of FIG. 2.

In FIG. 3, a PFC circuit 300 is an example implementation of the PFC circuit 212 of FIG. 2. The PFC circuit 300 includes a rectifier 304 that converts incoming AC into pulsating DC. In various implementations, the rectifier 304 includes a full-wave diode bridge. The DC output of the rectifier 304 is across first and second terminals. The first terminal is connected to a first node that is connected to a first end of a capacitor 306, a first end of a first inductor 308, a first end of a second inductor 310, and a first end of a third inductor 312. The second terminal is connected to a second node that is connected to a second end of the capacitor 306, a first terminal of a first lower switch 314, an anode of a first lower diode 316, a first terminal of a second lower switch 318, an anode of a second lower diode 320, a first terminal of a third lower switch 322, and an anode of a third lower diode 324. In various implementations, a DC voltage (e.g., from a DC battery) may be connected to the first and second terminals, and the rectifier 304 may be omitted.

A second end of the first inductor 308 is connected to a first current sensor 326. An opposite end of the first current sensor 326 is connected to a third node that is connected to a first terminal of a first upper switch 328, an anode of a first upper diode 330, a second terminal of the first lower switch 314, and a cathode of the first lower diode 316. The first current sensor 326 senses a current in the first inductor 308.

A second end of the second inductor 310 is connected to a second current sensor 332. An opposite end of the second current sensor 332 is connected to a fourth node that is connected to a first terminal of a second upper switch 334, an anode of a second upper diode 336, a second terminal of the second lower switch 318, and a cathode of the second lower diode 320. The second current sensor 332 senses a current in the second inductor 310.

A second end of the third inductor 312 is connected to a third current sensor 338. An opposite end of the third current sensor 338 is connected to a fifth node that is connected to a first terminal of a third upper switch 340, an anode of a third upper diode 342, a second terminal of the third lower switch 322, and a cathode of the third lower diode 324. The third current sensor 338 senses a current in the third inductor 312. While examples locations are shown for the first, second, and third current sensors 326, 332, and 338 could be located in another suitable location.

The PFC circuit 300 generates a voltage on a DC bus, where a first end of the DC bus is connected to a sixth node that is connected to a second terminal of the first upper switch 328, a cathode of the first upper diode 330, a second terminal of the second upper switch 334, a cathode of the second upper diode 336, a second terminal of the third upper switch 340, and a cathode of the first upper diode 330. A second end of the DC bus is connected to the first node.

A first upper driver 346, a first lower driver 348, a second upper driver 350, a second lower driver 352, a third upper driver 354, and a third lower driver 358 (collectively drivers 624) receive the power switch control signals from the control module 220 of FIG. 2 and (e.g., rapidly) vary power applied to control terminals of the first upper switch 328, the first lower switch 314, the second upper switch 334, the second lower switch 318, the third upper switch 340, and the third lower switch 322, respectively. The first upper switch 328, the first lower switch 314, the second upper switch 334, the second lower switch 318, the third upper switch 340, and the third lower switch 322 (collectively switches 626) may be field effect transistors with a gate terminal as the control terminal. More specifically, the switches 626 may each be power metal-oxide-semiconductor field-effect transistor (MOSFET), such as the STW38N65M5 power MOSFET from STMicroelectronics. The drivers 624, in response to the power switch control signals, control opening and closing of the switches 626.

In FIG. 3, the PFC circuit 300 includes three parallel converter legs that are each arranged in a bidirectional buck-boost configuration. For example, in FIG. 4 a first converter leg 410 includes the first inductor 308, the first upper switch 328, the first upper diode 330, the first lower switch 314, and the first lower diode 316. A second converter leg 420 includes the second inductor 310, the second upper switch 334, the second upper diode 336, the second lower switch 318, and the second lower diode 320. A third converter leg 430 includes the third inductor 312, the third upper switch 340, the third upper diode 342, the third lower switch 322, and the third lower diode 324.

While operating in a boost mode, the lower switch of a leg closes and the upper switch of the leg opens, causing current through the inductor of the leg to increase. The lower switch later is opened and the upper switch is closed, but the current through the inductor of the leg cannot change instantaneously because the voltage across an inductor is proportional to the derivative of the current. The voltage across the inductor becomes negative, meaning that the end of the inductor connected to the anode of the upper diode and the cathode of the lower diode experiences a voltage increase above the voltage output from the rectifier 304. The current through the inductor is therefore fed to the DC bus. The current through the inductor decreases. The upper switch is later opened and the lower switch is closed, causing the current through the inductor to increase.

In various implementations, the lower switch of each leg may be turned on until the current measured by the current sensor associated with the inductor of that leg is greater than a predetermined current threshold. At that time, the lower switch may be turned off (the upper switch is turned on) for a specified (desired) period of time (OFF time). This specified period may be varied by the control module 220, for example, as a function of the voltage of the DC bus and/or the AC input voltage. However, the time that the lower switch is held open is a specified value. Once a time equal to the specified value has elapsed after the lower switch is transitioned off, the lower switch is turned back on again (the upper switched is turned off), and the process repeats. The off time can be fixed or variable. In the case of the off time being variable, the off time can be limited to at least a predetermined minimum off time (period).

To reduce the physical size and parts cost of the PFC circuit 300, the inductance of the inductor of each converter leg (which may be the largest contributor to the physical size of the PFC circuit 300) may be minimized. However, with a lower inductance, the inductors will saturate more quickly. Therefore, the lower and upper switches of each converter leg will may operate more quickly. While more quickly and smaller are relative terms, the power switching control of the present application may operate in the range of 10 kilohertz to 20 kilohertz switching frequencies. In the present application, the switching frequency of the lower and upper switches of each converter leg may be increased to more than 50 kilohertz, more than 100 kilohertz, or more than 200 kilohertz. For example, the switching frequency of each switch may be controlled to be approximately 200 kilohertz. The inductance of the inductor of each inverter leg may be minimized accordingly.

The switches 626 may be chosen to allow for faster switching as well as to have low switching losses. With faster switching, the inductance of the inductors can be smaller. In addition, the upper and lower diodes may be faster (e.g., have faster response times). Silicon carbide diodes may have fast response times and may therefore be used. For example, the upper and lower diodes may be an STPSC2006CW Silicon Carbide dual diode package from STMicroelectronics.

In order to accurately drive the switches 626 when operating at higher speeds, the control strategy may similarly be accelerated. For example only, the control module 220 may include multiple devices, such as a microcontroller configured to perform more involved calculations and an FPGA (field programmable gate array) or PLD (programmable logic device) configured to monitor and respond to inputs in near real time. In this context, near real time may mean that the time resolution of measurement and time delay in responding to inputs of the FPGA or PLD is negligible compared to the physical time scale of interest. For faster switching speeds, the near real time response of the FPGA/PLD may introduce non-negligible delays. In such cases, the delay of the FPGA/PLD and driving circuitry may be measured and compensated for. For example, if the turn-off of a switch occurs later than needed because of a delay, the turn-off can be instructed earlier to compensate for the delay.

Figure 4:
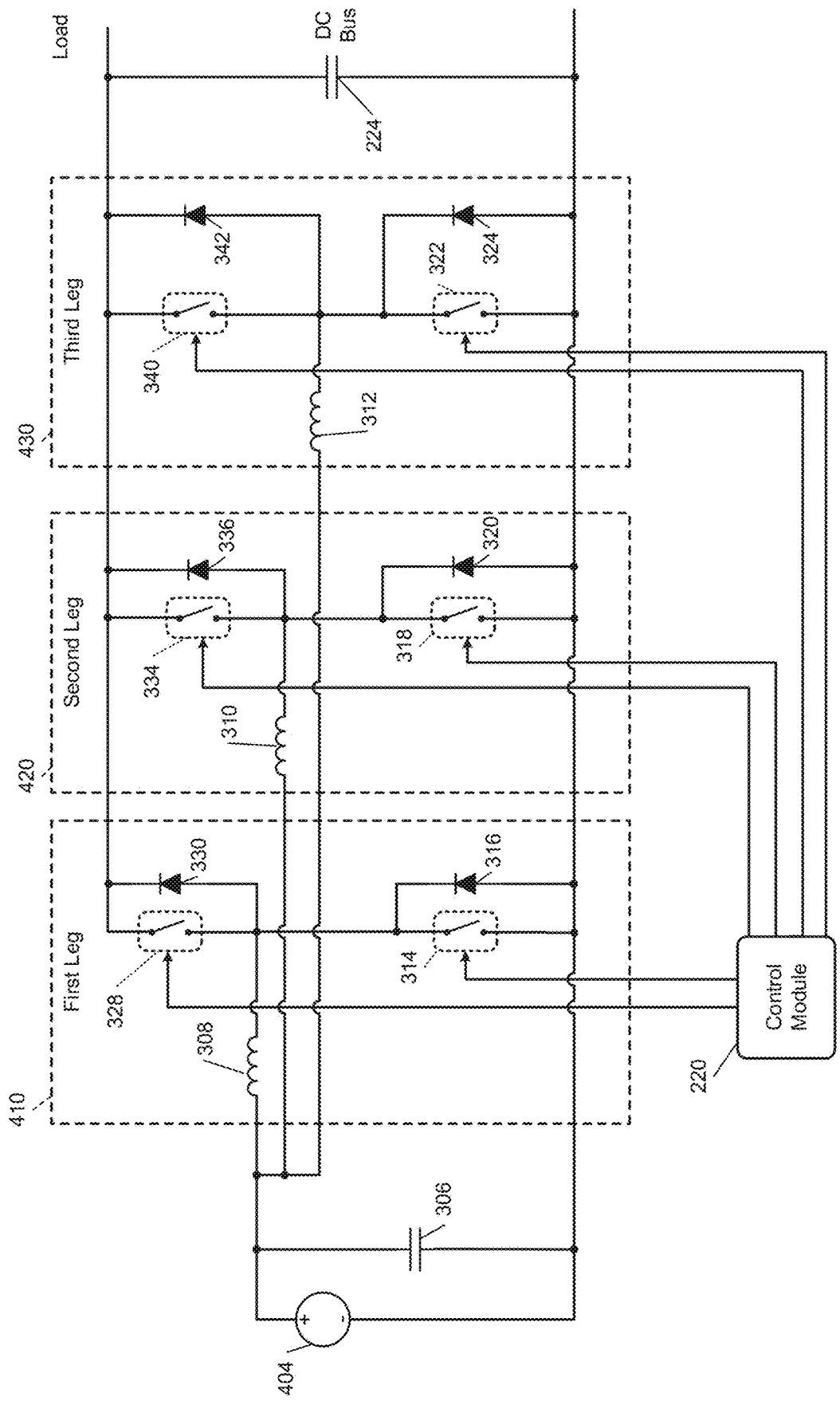
FIG. 4 is a functional block diagram of an example implementation of the PFC circuit of FIG. 3.

FIG. 4 is a simplified functional block diagram of the PFC circuit 300 of FIG. 3 and the control module 220. The rectifier 304 rectifies the AC input voltage to produce a DC voltage. This DC voltage is illustrated by DC voltage 404 in FIG. 4. The control module 220 controls switching of the switches 626 to convert the DC voltage 404 into a DC bus voltage that is greater than the DC voltage 404.

The control module 220 manages the phase relation between the parallel legs of the PFC circuit 300—for example, the first leg 410, the second leg 420, and the third leg 430. Managing the phase relation between the parallel legs may be referred to as interleaving. In general, the object of the interleaving is to spread the phase relation as evenly as possible amongst the parallel legs. For example, in the PFC circuit 300, the object may be to have each leg operate at the same switching frequency but phased 120 degrees (360/3) with respect to one another.

The interleaving spreads the ripple current evenly between the legs, so that the total current output from the PFC circuit 300 (sum of all currents) has minimized current ripple. Reduction of ripple current may reduce stress on capacitors and other components and may reduce EMI generated by the PFC circuit 300. Reduction of ripple current may also allow for a reduction in the size and cost of filter components—such as the filter capacitance 224.

Although the interleaving performed by the control module 220 is described below with respect to the first leg 410, the second leg 420, and the third leg 430 of the PFC circuit 300, the description is equally applicable to converters with a different numbers of parallel legs—for example, two legs or four or more legs. In converters having different numbers of legs, each leg may be phased from one another by 360 degrees divided by the number of legs. The present application is also applicable to converters which can vary the number of active legs by enabling or disabling individual legs. In those cases, the target phase offset between legs will vary, depending on number of enabled legs.

Figure 5:
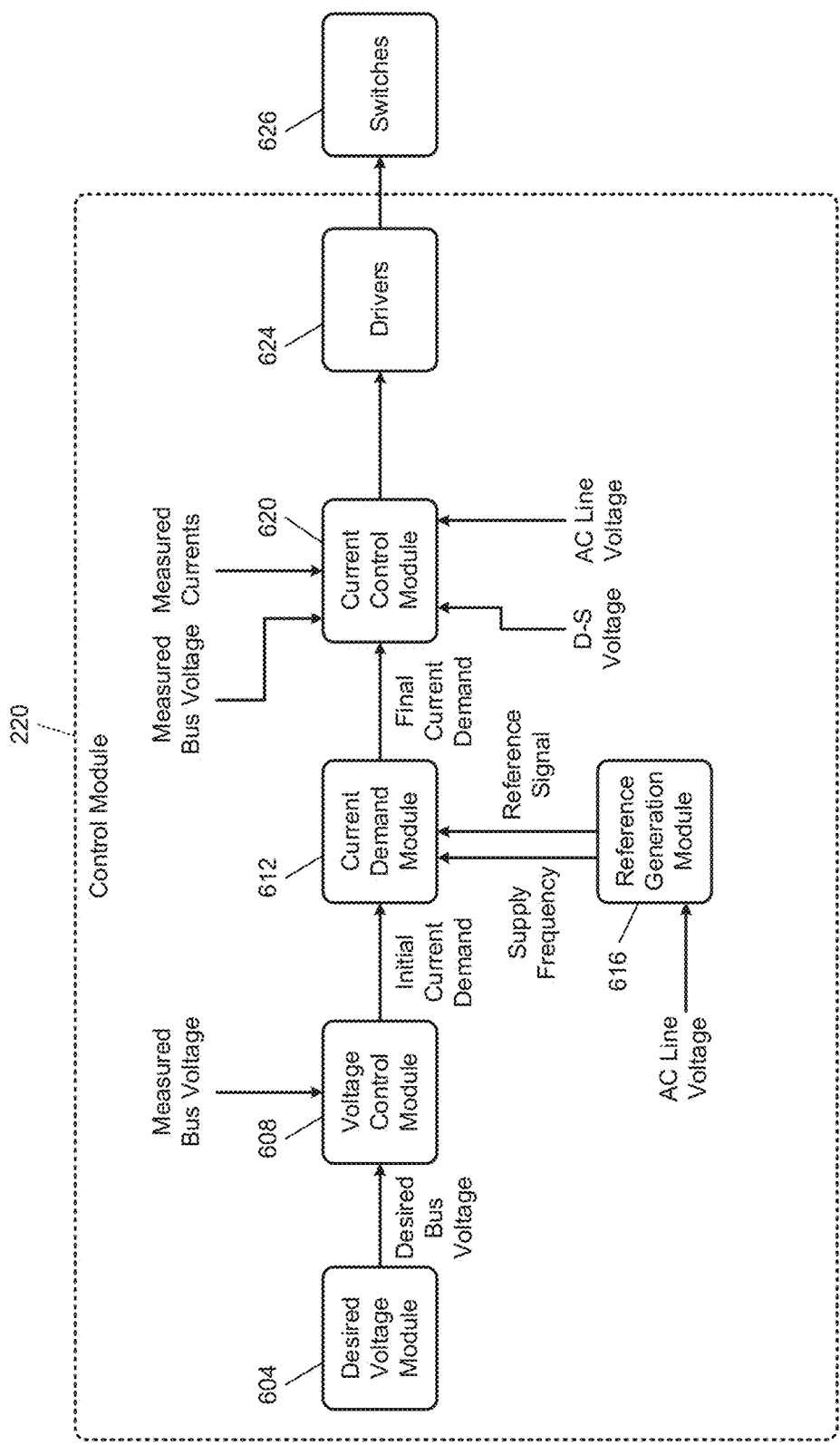
FIG. 5 is a functional block diagram of an example implementation of a control module.

FIG. 5 is a functional block diagram of an example implementation of the control module 220. A desired voltage module 604 determines a desired DC bus voltage (a desired voltage on the DC bus). The desired DC bus voltage may be a fixed predetermined value or may be variable. The desired voltage module 604 may determine the desired DC bus voltage, for example, based on a peak voltage of the AC line ($V_{PEAK}$) and/or at least one of a plurality of system parameters.

For example only, the plurality of system parameters may include, but are not limited to, actual and commanded compressor speed, actual and estimated inverter output power, actual and estimated drive output power, input and output current, drive input voltage, inverter output voltage, estimated motor torque, various temperatures, and a demand from the condenser 104. The various temperatures may include, for example, temperatures of the PFC circuit 212, the inverter power circuit 232, circuit boards, the compressor scroll, and the motor 236. By way of example, a look-up table may include a desired DC bus voltage $V_{DES}$ corresponding to possible AC peak voltages $V_{PEAK}$ and each of the different combinations of the plurality of system parameters. The desired voltage module 604 may determine the desired DC bus voltage using the look-up table. For values between entries of the look-up table, the desired voltage module 604 may determine the desired DC bus voltage using interpolation. Further example discussion regarding setting the desired DC bus voltage is provided in the U.S. Pat. No. 10,312,798, issued on Jun. 4, 2019, titled "Power Factor Correction Circuits and Methods Including Partial Power Factor Correction Operation for Boost and Buck Power Converters," the disclosure of which is incorporated herein in its entirety. Further example discussion regarding setting the desired DC bus voltage is provided in the U.S. Pat. No. 10,277,115, issued on Apr. 30, 2019, titled "Filtering Systems and methods for Voltage Control," the disclosure of which is incorporated herein in its entirety.

A voltage control module 608 (see also FIG. 6) determines a difference between the desired DC bus voltage and the measured DC bus voltage and determines a first current demand based on the difference. The voltage control module 608 applies a filter to the first current demand and determines an initial current demand based on the first and filtered current demands.

The voltage control module 608 weights the contributions of the first and filtered current demands to the initial current demand based on the magnitude of the difference between the measured and desired DC bus voltages. More specifically, the voltage control module 608 applies a greater weight to the filtered current demand when the magnitude of the difference is low. The voltage control module 608 increases the weighting of the first current demand and decreases the weighting of the filtered current demand as the difference increases.

A current demand module 612 (see e.g., FIG. 9) may apply a filter to the initial current demand, such as a notch filter. The current demand module 612 may also perform one or more signal processing functions to reduce noise in the initial current demand. The current demand module 612 multiplies the (filtered) initial current demand with a reference signal to produce a final current demand. While the example of the current demand module 612 filtering the initial current demand is provided, the current demand module 612 may not filter the initial current demand in other examples. In such a case, the initial current demand may be multiplied with the reference signal to produce the final current demand.

A reference generation module 616 (see e.g., FIGS. 13A-E) determines zero crossings of the AC line and the reference signal. Based on the zero crossings, the reference generation module 616 generates the reference signal to track the AC input voltage in phase and frequency. In this way, the final current demand follows the AC input voltage, for example, to maximize power factor.

A current control module 620 (see FIG. 11) controls switching of the switches 626. More specifically, the current control module 620 transitions the lower switch of each leg OFF (upper switch ON) when the measured current associated with the leg is greater than the current demand. The current control module 620 then maintains the lower switch OFF (upper switch ON) for at least a desired OFF period. The desired OFF period is variable, and the current control module 620 determines the desired OFF period, for example, based on the AC input voltage and/or the measured DC bus voltage. While the example of a variable desired OFF period is described, the current control module 620 could alternatively transition the lower switch of each leg ON (upper switch OFF) when the measured current associated with the leg is less than the current demand and maintain the lower switch ON for at least a desired ON period. An example of this is described in commonly assigned, U.S. patent application Ser. No. 15/419,423, filed on Jan. 30, 2017, which is incorporated herein in its entirety.

Figure 6:
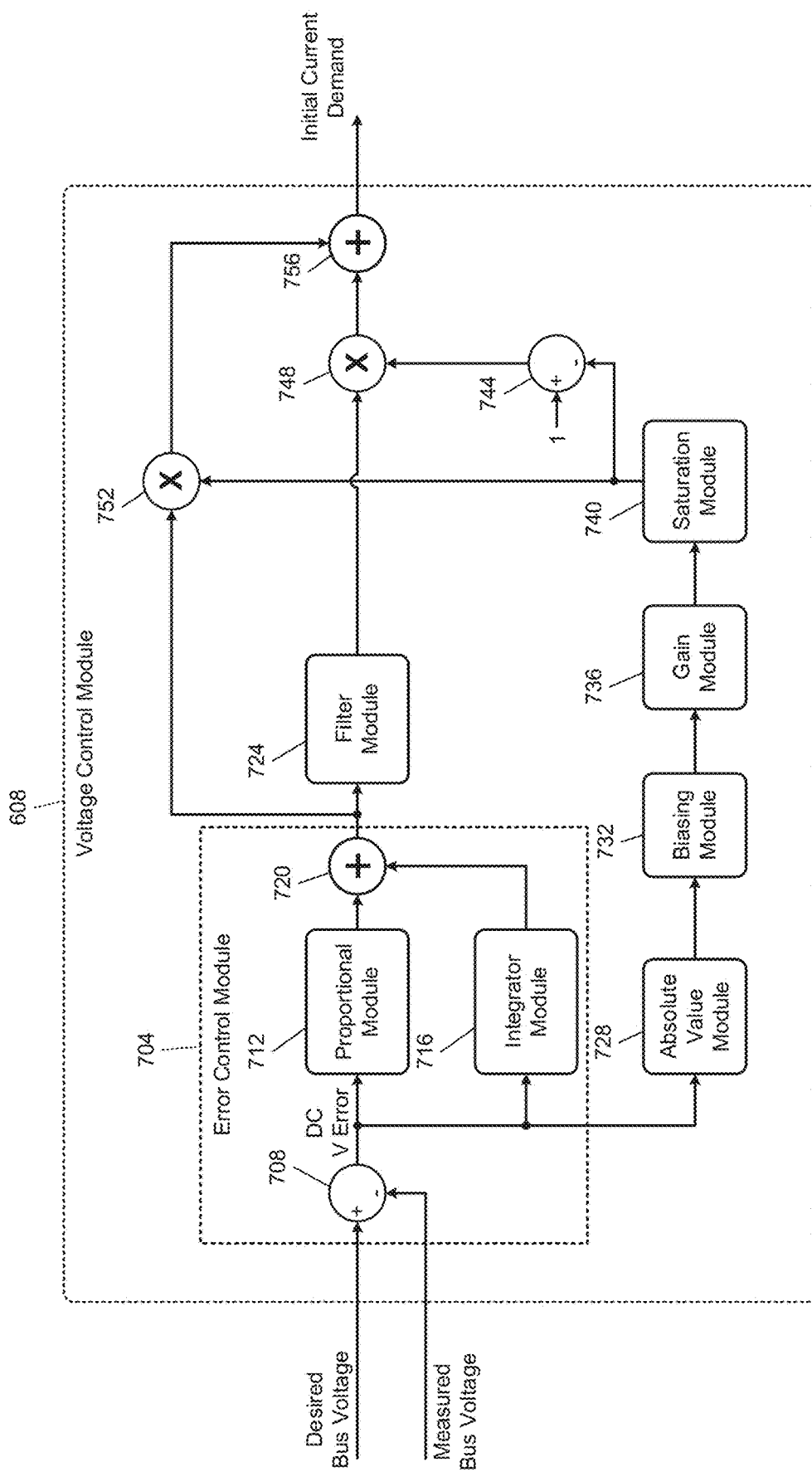
FIG. 6 is a functional block diagram of an example implementation of a voltage control module.

FIG. 6 is a functional block diagram of an example implementation of the voltage control module 608. As stated above, the voltage control module 608 generates an initial current demand based on the desired DC bus voltage and the measured DC bus voltage. The initial current demand corresponds to a target value for the measured current. The measured DC bus voltage is measured using a voltage sensor. The desired DC bus voltage is determined by the desired voltage module 604.

The voltage control module 608 includes an error control module 704 that receives the desired DC bus voltage and the measured DC bus voltage. The error control module 704 generates a first current demand to minimize the difference between the desired DC bus voltage and the measured DC bus voltage.

For example, a subtraction module 708 subtracts the measured DC bus voltage from the desired DC bus voltage to determine a DC voltage error. A proportional module 712 multiplies the DC voltage error by a proportional constant. An integrator module 716 combines the DC voltage error with a previous output of the integrator module 716. The integrator module 716 may first multiply the DC voltage error by an integral constant. The integrator module 716 may also apply upper and/or lower limits to its output. In various implementations, the integrator module 716 may bias its output to adjust toward a tracking input (e.g., the second current demand).

A summation module 720 adds the output of the proportional module 712 with the output of the integrator module 716. The sum from the summation module 720 is output from the error control module 704 as the first current demand. Although the error control module 704 is shown for purposes of illustration as a Proportional-Integral (PI) controller, another suitable type of closed-loop controller may be used. Additionally, a feed-forward component may also be implemented which may be summed with a feedback component (e.g., the sum) to generate the first current demand.

Figure 7:
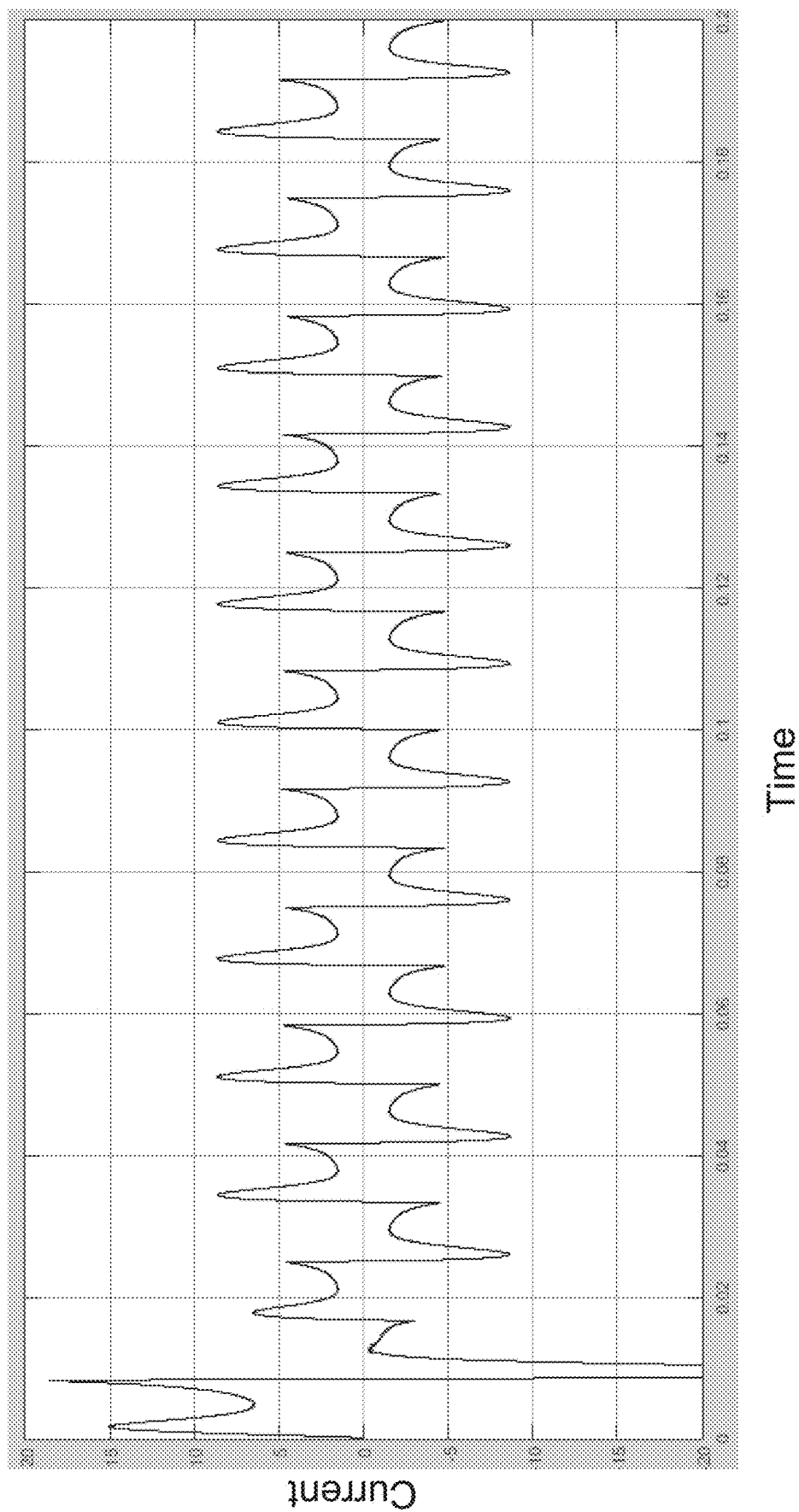
FIGS. 7-8 are example graphs of current versus time.
Figure 8:
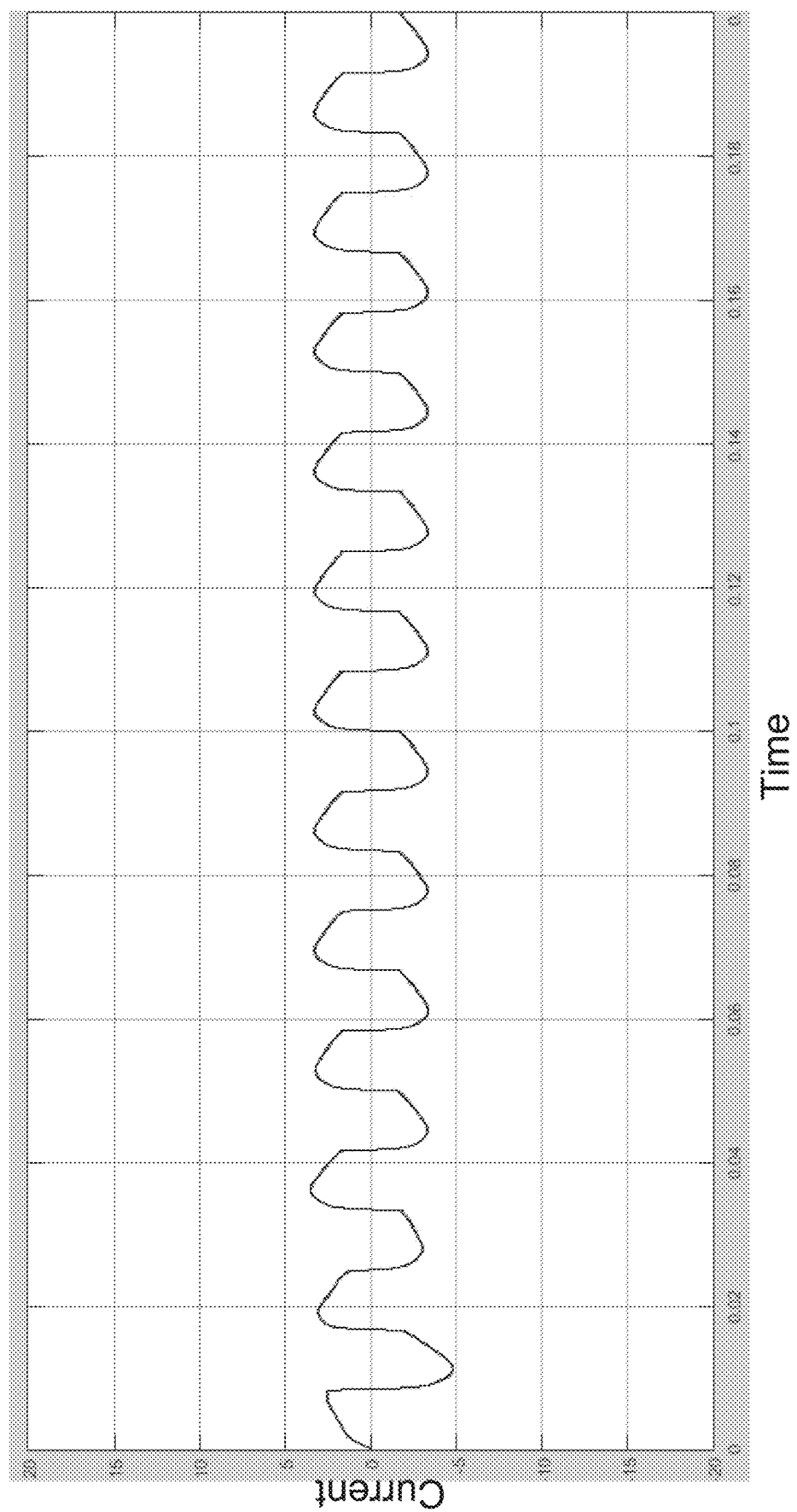

A filter module 724 applies a filter to the first current demand to produce a second current demand. The filter may be, for example, a low-pass filter (LPF) or another suitable type of filter. A cutoff frequency of the filter may be calibrated, for example, to smooth cycle-to-cycle ripple that may be attributable to the error control module 704. The filter module 724 may lower bandwidth and may smooth/attenuate the cycle-to-cycle ripple created by the error control module 704 attempting to adjust the measured DC bus voltage toward the desired DC bus voltage. For example only, FIG. 7 includes an example graph of current produced using a PI controller based on a sinusoidal input voltage. FIG. 8 includes an example graph of current produced using low pass filtering of the output of a PI controller.

Referring back to FIG. 6, the voltage control module 608 also includes a weighting module that weights the contributions of the first and second current demands to the initial current demand. The weighting module reduces of use of the second current demand and increases the use of the first current demand as the DC voltage error increases. This may minimize harmonics and minimize response time to load changes.

An absolute value module 728 determines and outputs an absolute value (i.e., magnitude) of the DC voltage error. A biasing module 732 applies a bias to the absolute value of the DC voltage error to require that the DC voltage error be larger than a predetermined biasing value before decreasing the contribution of the second current demand and including a contribution of the first current demand. For example, the biasing module 732 may set its output based on or equal to the predetermined biasing value (e.g., 10 V) subtracted from the absolute value of the DC voltage error. When the absolute value of the DC voltage error is less than the predetermined biasing value, the initial current demand may be set equal to the second current demand due to the biasing. The biasing is associated with the saturation module (740) discussed further below.

A gain module 736 applies a predetermined gain value to the output of the biasing module 732. For example, the gain module 736 set its output based on or equal to the output of the biasing module 732 multiplied by the predetermined gain value. The predetermined gain value may be, for example, approximately 0.2 or another suitable value.

A saturation module 740 may apply limits to the output of the gain module 736. As used herein, saturation modules may enforce a lower limit, an upper limit, both upper and lower limits, or neither limit. The upper and lower limits may be predetermined and/or may be updated based upon various parameters. In the case of the saturation module 740, the lower limit may be, for example, zero to re-enforce the biasing applied by the biasing module 732. The upper limit of the saturation module 740 may be 1 to limit weighting values to between 0 and 1, inclusive. The output of the saturation module 740 is a first weighting value for weighting the contribution of the first current demand.

A subtraction module 744 subtracts the output of the saturation module 740 from a predetermined value, such as 1. The output of the subtraction module 744 is a second weighting value for weighting the contribution of the second current demand. A multiplication module 748 multiplies the second current demand output by the filter module 724 with the second weighting value output by the subtraction module 744 to produce a third demanded current. A multiplication module 752 multiplies the first current demand output by the error control module 704 with the first weighting value output by the saturation module 740 to produce a fourth current demand. The modules 728, 732, 736, 740, 744, 748, and 752 can collectively be referred to as the weighting module. A summation module 756 adds the third current demand with the fourth current demand to produce the initial current demand.

As discussed further below, the initial current demand is multiplied with a sinusoidal reference signal that is generated to be synchronized with the AC input voltage. This may provide a better power factor and minimize harmonics of the AC input current as the load may draw more sinusoidal current and power. Generation of the reference signal is also discussed below.

Figure 9:
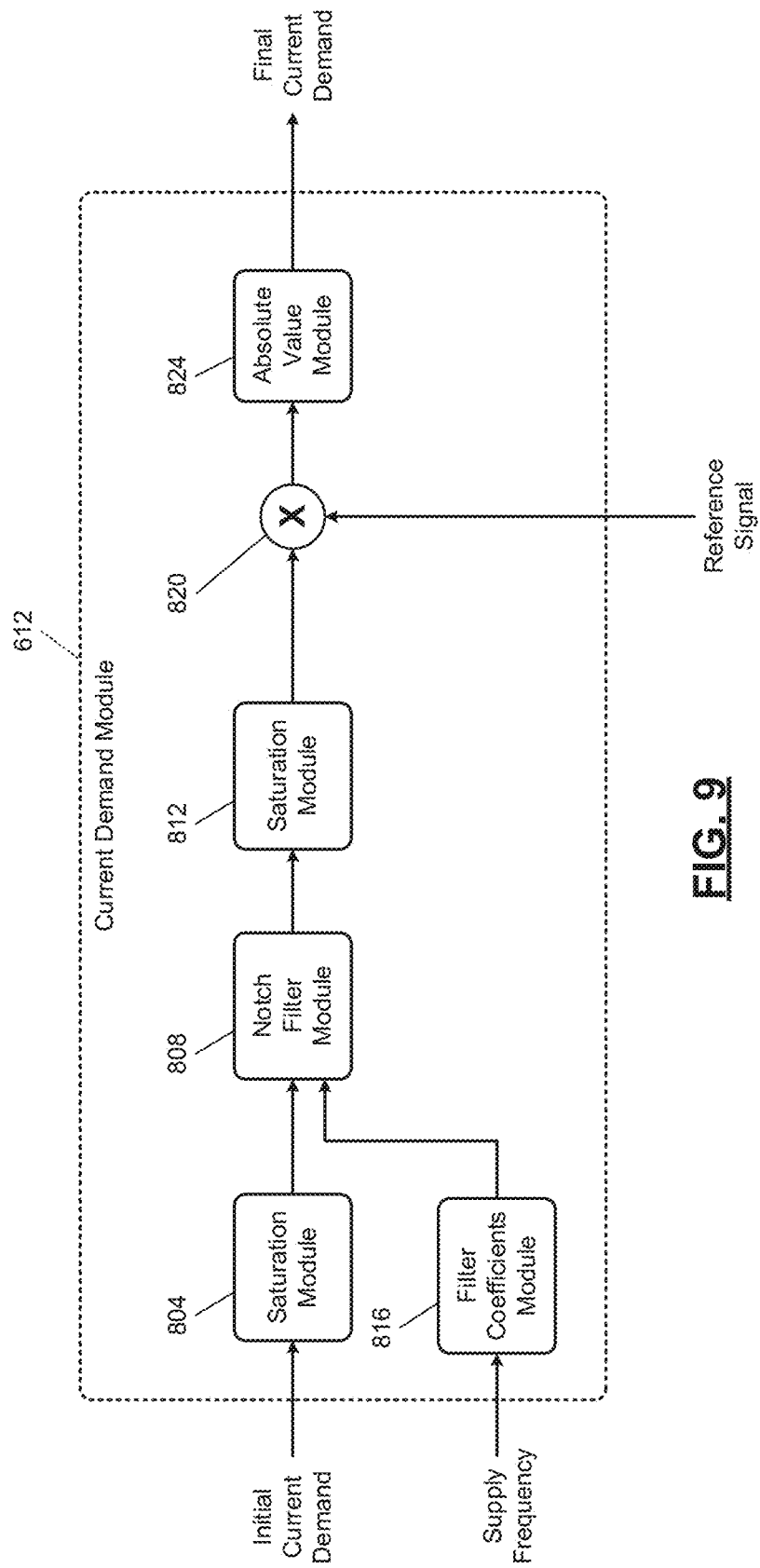
FIG. 9 is a functional block diagram of an example implementation of a current demand module.

FIG. 9 includes a functional block diagram of an example implementation of the current demand module 612. A saturation module 804 may apply one or more limits to the initial current demand before the initial current demand is input to a notch filter module 808. The notch filter module 808 applies a notch filter to the initial current demand, and a saturation module 812 may apply one or more limits to the initial current demand output by the notch filter module 808. While the example of the use of the saturation modules 804 and 812 is shown and discussed, one or both of the saturation modules 804 and 812 may be omitted and/or replaced with other suitable types of signal processing. The application of the notch filter reduces harmonics while allowing for a fast response to load changes.

The notch filter may be, for example, a first or second order polynomial notch filter. For example only, the notch filter may be represented by the following second order transfer function.

$$\frac{b0 + b1 * z^{-1} + b2 * z^{-2}}{a0 + a1 * z^{-1} + a2 * z^{-2}},$$

where the b0, b1, b2, a0, a1, and a2 are filter coefficients, and z is the initial current demand input to the notch filter module 808. One or more of the filter coefficients may be fixed, predetermined values. For example, the filter coefficients b0, b2, a0, and a2 may be fixed predetermined values. The filter coefficient a0 may be 1 (one) in various implementations. In various implementations, the filter coefficients b0, b2, a0, and/or a2 may be variable values.

A filter coefficients module 816 determines one or more filter coefficients (e.g., a1 and b1) for the notch filter based on a frequency of the AC input voltage. Since the reference signal is generated to be synchronous with the AC input voltage, the frequency of the AC input voltage may be represented by the frequency of the reference signal. The frequency of the reference signal may be used as a supply frequency. Alternatively, a frequency of the AC input voltage may be measured and used as the supply frequency. The notch may be, for example, approximately twice the supply frequency.

The filter coefficients module 816 may determine the filter coefficient(s) using one or more look-up tables and/or functions that relate the supply frequency to the filter coefficient(s). For values between entries of the look-up table, the filter coefficients module 816 may determine the filter coefficient(s) using interpolation. In various implementations, the filter coefficients a1 and b1 may be the same value or may be determined using the same look-up table or function. Examples of such a function include a second order polynomial equation using predetermined coefficients for determining the filter coefficients (e.g., a1 and b1) as a function of the supply frequency.

As stated above, the saturation module 812 may apply one or more limits to the initial current demand output by the notch filter module 808. A multiplier module 820 multiplies the output of the saturation module 812 with the reference signal. An absolute value module 824 determines and outputs an absolute value (i.e., magnitude) of the output of the multiplier module 820 to produce a final current demand.

Alternatively, the absolute value module 824 may be omitted, and an absolute value of the reference signal may be input to the multiplier module 820. The absolute value usage places the final current demand into correspondence with the post-rectification current. As discussed further below, the final current demand is used to control switching of the switches 626 based on a comparison with the measured currents.

Figure 10:
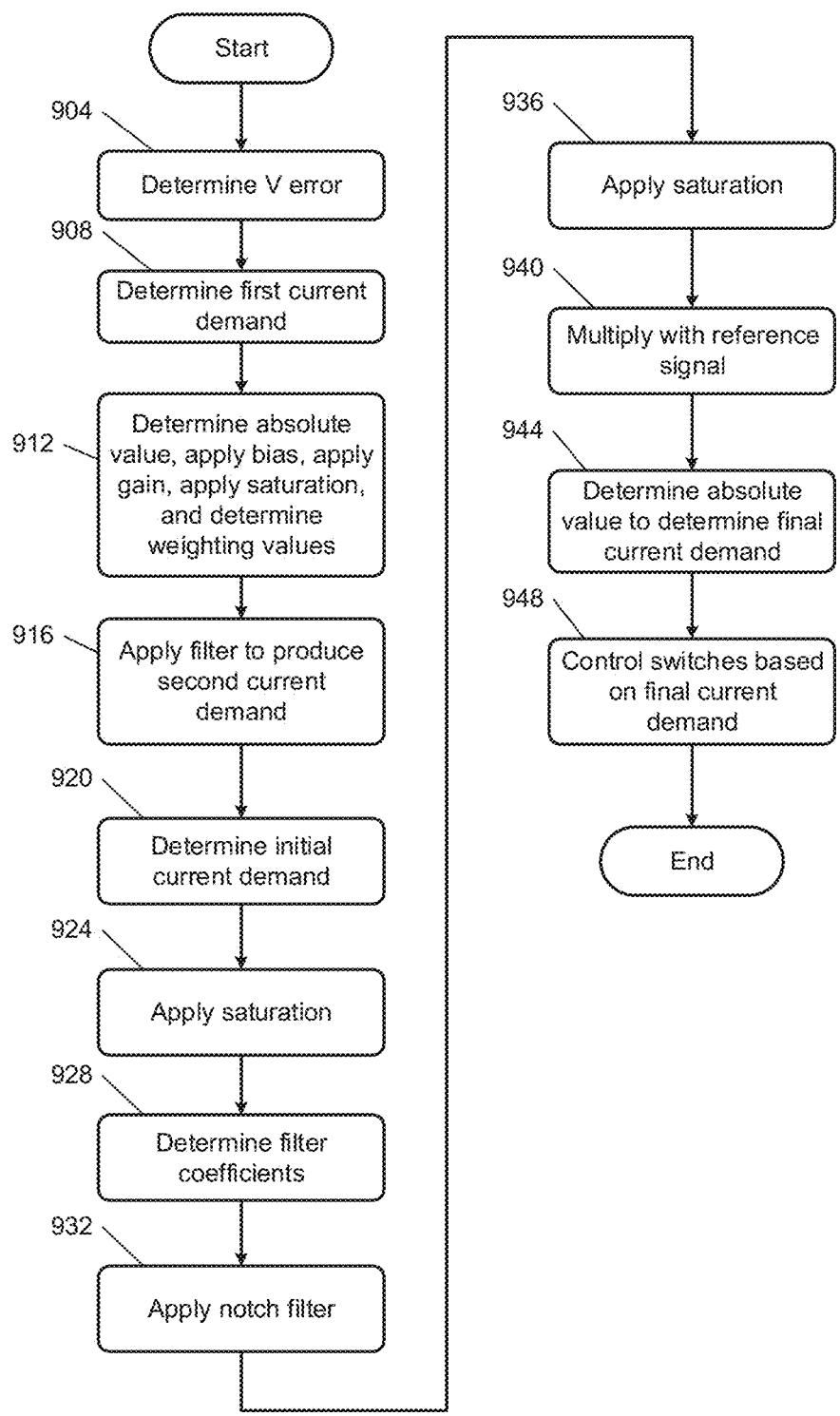
FIG. 10 is a flowchart depicting an example method of determining a final current demand.

FIG. 10 is a flowchart depicting an example method of determining the final current demand. Control begins with 904 where the error control module 704 determines the DC voltage error based on the difference between the desired DC bus voltage and the measured DC bus voltage. At 908, the error control module 704 determines the first current demand based on the voltage bus error, for example, using PI control, as discussed above.

At 912, the absolute value module 728 determines an absolute value of the DC voltage error, and the biasing module 732 applies the bias to the absolute value of the DC voltage error. For example, the biasing module 732 may set its output based on or equal to the predetermined biasing value (e.g., 10 V) subtracted from the absolute value of the DC voltage error. The gain module 736 applies the predetermined gain value to the output of the biasing module 732, and the saturation module 740 may apply limits to the output of the gain module 736. The output of the saturation module 740 corresponds to the first weighting value for weighting the contribution of the first current demand.

Also at 912, the subtraction module 744 determines the second weighting value for weighting the contribution of the second current demand. For example, the subtraction module 744 may set the second weighting value based on or equal to 1 minus the first weighting value. Generally, due to the biasing, the first weighting value may be zero or approximately zero (such that the second weighting value may be one or approximately one) when the DC voltage error is less than the predetermined biasing value. The second weighting value may decrease toward zero and the first weighting value may increase toward one as the DC voltage error increases above the predetermined biasing value. While the example of use of the first and second weighting values and the first and second current demands, one or more additional filters could be applied to determine the second current demand from the first current demand. In such examples, more weighting values could be used, or the first and second weighting values could be applied to a different combination of current demands.

At 916, the filter module 724 applies the filter to the first current demand to produce the second current demand. At 920, the multiplication module 752 multiplies the first current demand by the first weighting value to produce the third current demand, and the multiplication module 748 multiplies the second current demand by the second weighting value to produce the fourth current demand. Also at 920, the summation module 756 sets the initial current demand equal to or based on the sum of the third current demand and the fourth current demand.

At 924, the saturation module 804 may apply upper and/or lower limits to the initial current demand. In various implementations, the application of upper and/or lower limits may be omitted or replaced with one or more other types of signal processing. At 928, the filter coefficients module 816 determines the filter coefficients for the notch filter. The filter coefficients module 816 determines the filter coefficients based on the supply frequency.

At 932, the notch filter module 808 applies the notch filter, using the filter coefficients, to the initial current demand. At 936, the saturation module 812 may apply upper and/or lower limits to the initial current demand output by the notch filter module 808. In various implementations, the application of upper and/or lower limits may be omitted or replaced with one or more other types of signal processing.

At 940, the multiplier module 820 sets the final current demand based on or equal to the initial current demand (e.g., output by the saturation module 812) multiplied by the reference signal. The absolute value module 824 may determine an absolute value of the final current demand at 944. At 948, the current control module 620 controls switching of the switches 626 based on the final current demand and the measured current. As discussed further below, the current control module 620 may transition the first lower switch 314, the second lower switch 318, and the third lower switch 322 from ON to OFF when the measured current becomes greater than the final current demand.

Figure 11:
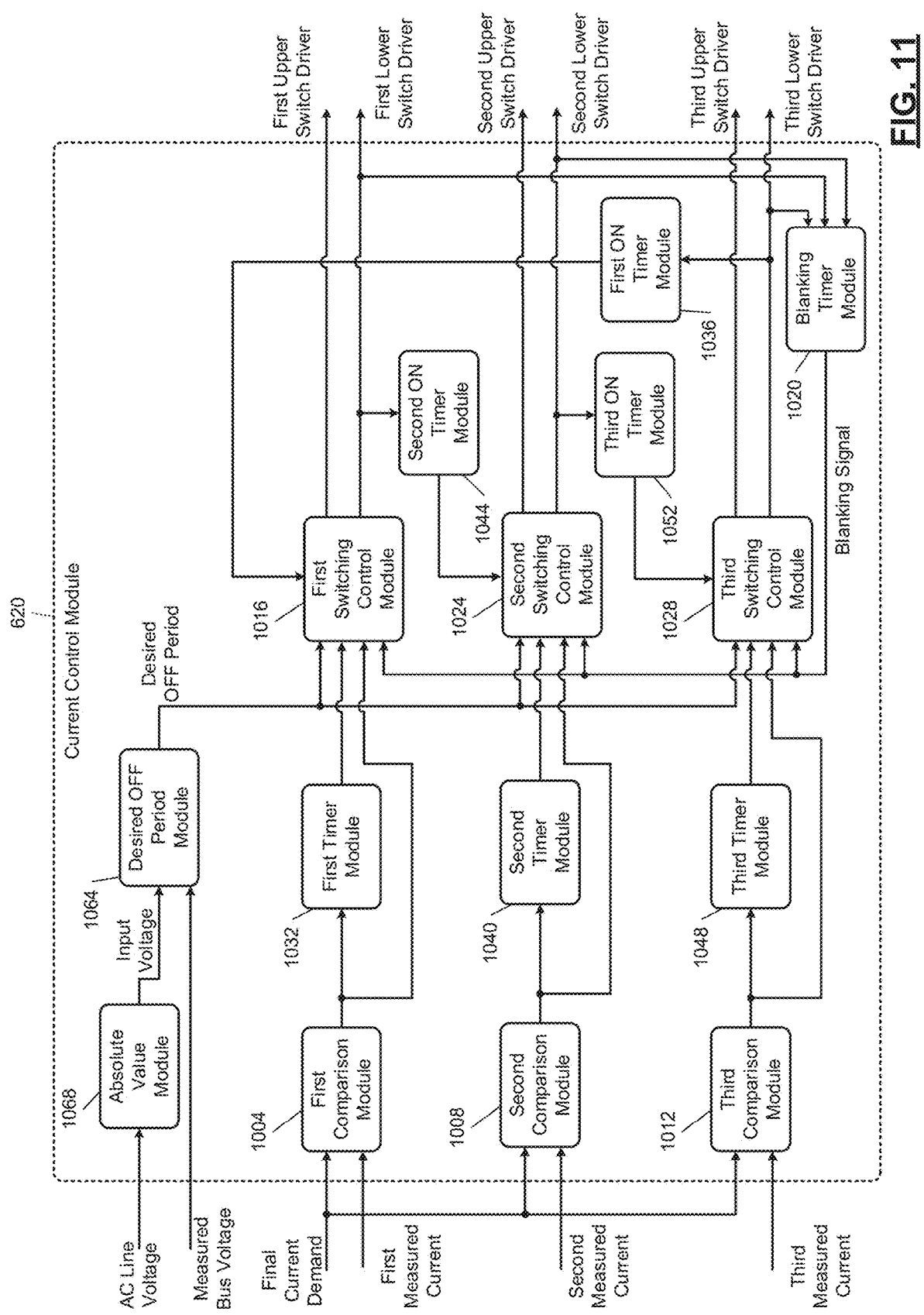
FIG. 11 is a functional block diagram of an example implementation of a current control module.

FIG. 11 is a functional block diagram of an example implementation of the current control module 620. The current control module 620 controls switching of the switches 626 based on a comparison of the final current demand with measured currents in the first inductor 308, the second inductor 310, and the third inductor 312. The measured currents in the first inductor 308, the second inductor 310, and the third inductor 312 may be measured using the first current sensor 326, the second current sensor 332, and the third current sensor 338, respectively.

A first comparison module 1004 sets a first comparison signal to a first state when the measured current in the first inductor 308 is less than the final current demand. The first comparison module 1004 sets the first comparison signal to a second state when the measured current in the first inductor 308 is greater than the final current demand. Similarly, a second comparison module 1008 sets a second comparison signal based on a comparison of the final current demand and the measured current in the second inductor 310 and a third comparison module 1012 sets a third comparison signal based on a comparison the final current demand and the current measured in the third inductor 312. The second comparison module 1008 sets the second comparison signal to a first state when the measured current in the second inductor 310 is less than the final current demand. The second comparison module 1008 sets the second comparison signal to a second state when the measured current in the second inductor 310 is greater than the final current demand. The third comparison module 1012 sets the third comparison signal to a first state when the measured current in the third inductor 312 is less than the final current demand. The third comparison module 1012 sets the third comparison signal to a second state when the measured current in the third inductor 312 is greater than the final current demand.

A first switching control module 1016 controls switching of the first upper switch 328 and the first lower switch 314 based on the comparison of the measured current in the first inductor 308 with the final current demand. For example, the first switching control module 1016 transitions the first lower switch 314 to OFF (not conducting) when the first comparison signal transitions from the first state to the second state and a blanking signal from a blanking timer module 1020 is in a second state.

The blanking timer module 1020 sets the blanking signal to a first state when a count-down timer is greater than zero and sets the blanking signal to the second state when the count-down timer reaches zero. The blanking timer module 1020 restarts the count-down timer each time the current control module 620 transitions either the first lower switch 314, the second lower switch 318, or the third lower switch 322 to OFF. In various implementations, the blanking timer module 1020 may reset the count-down timer to 0.5-5 microseconds or another suitable predetermined period. The blanking timer module 1020 may be set to a small enough value to avoid having to wait longer than necessary to switch another phase yet long enough to mask noise from switching of another phase. In other implementations, the count-down timer may start at another time suitable to prevent common-mode noise from triggering a leg when switching of another leg occurs and induces noise into the current measurements of the leg. While the example of use of a count-down timer and zero is discussed, a count-up timer and a predetermined period may alternatively be used.

After waiting for a predetermined dead time duration (period) after transitioning the first lower switch 314 to OFF, the first switching control module 1016 transitions the first upper switch 328 to ON (conducting). During the predetermined dead time duration, both the first lower switch 314 and the first upper switch 328 are OFF. The first switching control module 1016 waits until the expiration of the dead-time duration to transition the first upper switch to ON to avoid a cross-conduction situation where both the first lower switch 314 and the first upper switch 328 are ON. The length of the predetermined dead time duration may be set to a value that corresponds to the time required for the switches 626 to stop conducting after receiving a signal from the current control module 620 to transmission to OFF.

A second switching control module 1024 controls switching of the second upper switch 334 and the second lower switch 318 based on the comparison of the measured current in the second inductor 310 with the final current demand. For example, the second switching control module 1024 transitions the second lower switch 318 to OFF when the second comparison signal transitions from the first state to the second state and the blanking signal from the blanking timer module 1020 is in the second state. After waiting for the predetermined dead time duration after transitioning the second lower switch 318 to OFF, the second switching control module 1024 transitions the second upper switch 334 to ON.

A third switching control module 1028 controls switching of the third upper switch 340 and the third lower switch 322 based on the comparison of the measured current in the third inductor 312 with the final current demand. For example, the third switching control module 1028 transitions the third lower switch 322 to OFF when the third comparison signal transitions from the first state to the second state and the blanking signal from the blanking timer module 1020 is in the second state. After waiting for the predetermined dead time duration after transitioning the third lower switch 322 to OFF, the third switching control module 1028 transitions the third upper switch 340 to ON.

The first switching control module 1016, the second switching control module 1024, and the third switching control module 1028 maintain the first lower switch 314, the second lower switch 318, and the third lower switch 322 OFF for equal to or greater than the desired OFF period, respectively. The first switching control module 1016 maintains the first lower switch 314 OFF until (i) an OFF period of the first lower switch 314 is greater than or equal to the desired OFF period and a period since the third lower switch 322 was last turned ON is greater than or equal to a determined first previous ON delay or (ii) the OFF period reaches a first determined maximum permitted value. The second switching control module 1024 maintains the second lower switch 318 OFF until (i) an OFF period of the second lower switch 318 is greater than or equal to the desired OFF period and a period since the first lower switch 314 was last turned ON is greater than or equal to a determined second previous ON delay or (ii) the OFF period reaches a second determined maximum permitted value. The third switching control module 1028 maintains the third lower switch 322 OFF until (i) an OFF period of the third lower switch 322 is greater than or equal to the desired OFF period and a period since the second lower switch 318 was last turned ON is greater than or equal to a determined third previous ON delay or (ii) the OFF period reaches a third determined maximum permitted value.

The OFF period of the first lower switch 314 corresponds to the period since the measured current in the first inductor 308 last became greater than the final current demand. The first switching control module 1016 determines the first previous ON delay and the first determined maximum permitted value based on the value of the most recent period of the first leg 410. The period of the first leg 410 corresponds to the length of time between the last two times the first comparison module 1004 transitioned the first comparison signal from the first state to the second state.

A first timer module 1032 increments the OFF period of the first lower switch 314 when the first comparison signal is in the second state. For example, the first timer module 1032 increments the OFF period of the first lower switch 314 when the first lower switch 314 is OFF. In this manner, the OFF period of the first lower switch 314 tracks the period elapsed since the first switching control module 1016 last transitioned the first lower switch 314 from ON to OFF (i.e., the measured current in the first inductor 308 became greater than the final current demand). In response to the first comparison signal transitioning from the first state to the second state, the first switching control module 1016 stores the current value of the first timer module 1032 as the period of the first leg 410 and the first timer module 1032 resets the OFF period of the first lower switch 314.

The first switching control module 1016 sets the first determined maximum permitted value based on the stored period of the first leg 410. In various implementations, the first switching control module 1016 sets the first determined maximum permitted value to be 17/16 of the stored period of the first leg 410. In other implementations, the first switching control module 1016 may set the first determined maximum permitted value to another suitable value or another suitable function of the stored period of the first leg 410.

The OFF period of the second lower switch 318 corresponds to the period since the measured current in the second inductor 310 last became greater than the final current demand. The second switching control module 1024 determines the second previous ON delay and the second determined maximum permitted value based on the value of the most recent period of the second leg 420. The period of the second leg 420 corresponds to the length of time between the last two times the second comparison module 1008 transitioned the second comparison signal from the first state to the second state.

A second timer module 1040 increments the OFF period of the second lower switch 318 when the second comparison signal is in the second state. For example, the second timer module 1040 increments the OFF period of the second lower switch 318 when the second lower switch 318 is OFF. In this manner, the OFF period of the second lower switch 318 tracks the period elapsed since the second switching control module 1024 last transitioned the second lower switch 318 from ON to OFF (i.e., the measured current in the second inductor 310 became greater than the final current demand).

In response to the second comparison signal transitioning from the first state to the second state, the second switching control module 1024 stores the current value of the second timer module 1040 as the period of the second leg 420 and the second timer module 1040 resets the OFF period of the second lower switch 318.

The second switching control module 1024 sets the second determined maximum permitted value based on the stored period of the second leg 420. In various implementations, the second switching control module 1024 sets the second determined maximum permitted value to be 17/16 of the stored period of the second leg 420. In other implementations, the second switching control module 1024 may set the second determined maximum permitted value to another suitable value or another suitable function of the stored period of the second leg 420.

The OFF period of the third lower switch 322 corresponds to the period since the measured current in the third inductor 312 last became greater than the final current demand. The third switching control module 1028 determines the third previous ON delay and the third determined maximum permitted value based on the value of the most recent period of the third leg 430. The period of the third leg 430 corresponds to the length of time between the last two times the third comparison module 1012 transitioned the second comparison signal from the first state to the second state.

A third timer module 1048 increments the OFF period of the third lower switch 322 when the third comparison signal is in the second state. For example, the third timer module 1048 increments the OFF period of the third lower switch 322 when the third lower switch 322 is OFF. In this manner, the OFF period of the third lower switch 322 tracks the period elapsed since the third switching control module 1028 last transitioned the third lower switch 322 from ON to OFF (i.e., the measured current in the third inductor 312 became greater than the final current demand). In response to the third comparison signal transitioning from the first state to the second state, the third switching control module 1028 stores the current value of the third timer module 1048 as the period of the third leg 430 and the third timer module 1048 resets the OFF period of the third lower switch 322.

The third switching control module 1028 sets the third determined maximum permitted value based on the stored period of the third leg 430. In various implementations, the third switching control module 1028 sets the third determined maximum permitted value to be 17/16 of the stored period of the third leg 430. In other implementations, the third switching control module 1028 may set the third determined maximum permitted value to another suitable value or another suitable function of the stored period of the third leg 430.

A first ON timer module 1036 increments an ON period of the third lower switch 322. Specifically, the first ON timer module 1036 resets and starts a timer in response to the third switching control module 1028 transitioning the third lower switch 322 from OFF to ON. The first ON timer module 1036 outputs the value of the timer to the first switching control module 1016 as the ON period.

A second ON timer module 1044 increments an ON period of the first lower switch 314. Specifically, the second ON timer module 1044 resets and starts a timer in response to the first switching control module 1016 transitioning the first lower switch 314 from OFF to ON. The second ON timer module 1044 outputs the value of the timer to the second switching control module 1024 as the ON period.

A third ON timer module 1052 increments an ON period of the second lower switch 318. Specifically, the third ON timer module 1052 resets and starts a timer in response to the second switching control module 1024 transitioning the second lower switch 318 from OFF to ON. The third ON timer module 1052 outputs the value of the timer to the third switching control module 1028 as the ON period.

The first switching control module 1016 compares the value received from the first ON timer module 1036 with the first previous ON delay. The second switching control module 1024 compares the value received from the second ON timer module 1044 with the second previous ON delay. The third switching control module 1028 compares the value received from the third ON timer module 1052 with the third previous ON delay. The first switching control module 1016, the second switching control module 1024, and the third switching control module 1028 determine the respective previous ON delays based on the leg period stored in each switching control module and the total number of legs in the PFC circuit 300. For example, the switching control modules may each set the previous ON delays based on:

$$\text{ON Delay} = \text{Leg Period} * \frac{1}{n}$$

where ON delay is the previous ON delay period, Leg Period is the stored period of the respective leg, and n is the number of active legs (three) in the PFC circuit 300. In various implementations, the switching control modules may set each previous ON delay to a value less than ON Delay. As an example, the switching control modules may set the previous ON delay to Leg Period*(9/32). 9/32 of the stored leg period is near an (e.g., ideal) 33.33% phase relation for equal interleaving of three legs. In addition, the 9/32 ratio is computationally easy to calculate with a power-of-two divisor in fixed-point integer math. As another example, the switching control modules may set the previous ON delay to Leg Period*(21/64).

A desired OFF period module 1064 determines the desired OFF period. Written generally, for a bi-direction converter operating in boost mode, the desired OFF period module 1064 may determine the desired OFF period based on input voltage, output voltage, and a predetermined switching period. An equation or a lookup table may be used to determine the desired OFF period given the input voltage, output voltage, and the predetermined switching period. The predetermined switching periods ($t_p$) correspond to a predetermined switching frequency. The predetermined switching frequency may be, for example, approximately 200 kilohertz (kHz) or another suitable switching frequency. The predetermined switching periods correspond to 1 divided by the predetermined switching frequency. The current control module 620 may control a switch to be ON (conducting) and OFF (not conducting) for different portions of each predetermined switching period. In various implementations, a frequency module (not shown) may randomly vary the predetermined switching frequency or the predetermined switching period, for example, according to an output of a random number generator.

The input voltage may correspond to the voltage input to the PFC circuit 300. For example, an absolute value module 1068 determines and outputs an absolute value (i.e., magnitude) of the AC input voltage measured by an AC input voltage sensor. The output of the absolute value module 1068 may be used as the input voltage. The output voltage may be the measured DC bus voltage. While the example of a sinusoidal AC input has been described, the present application is also applicable to other types of inputs including rectified inputs resulting from rectification of AC inputs.

The desired OFF period module 1064 may determine the desired OFF period using one of a function and a look-up table that relates input voltages and output voltages to desired OFF times given the predetermined switching period. For values between entries of the look-up table, the desired OFF period module 1064 may determine the desired OFF period using interpolation. As an example, for a bi-direction converter operating in boost mode (e.g., the boost converter of FIG. 4) the desired OFF period module 1064 may set the desired OFF period based on or equal to $$t_p * \frac{V_I}{V_O},$$

where $t_p$ is the predetermined switching period, $V_I$ is the input voltage, and $V_O$ is the output voltage.

Figure 12:
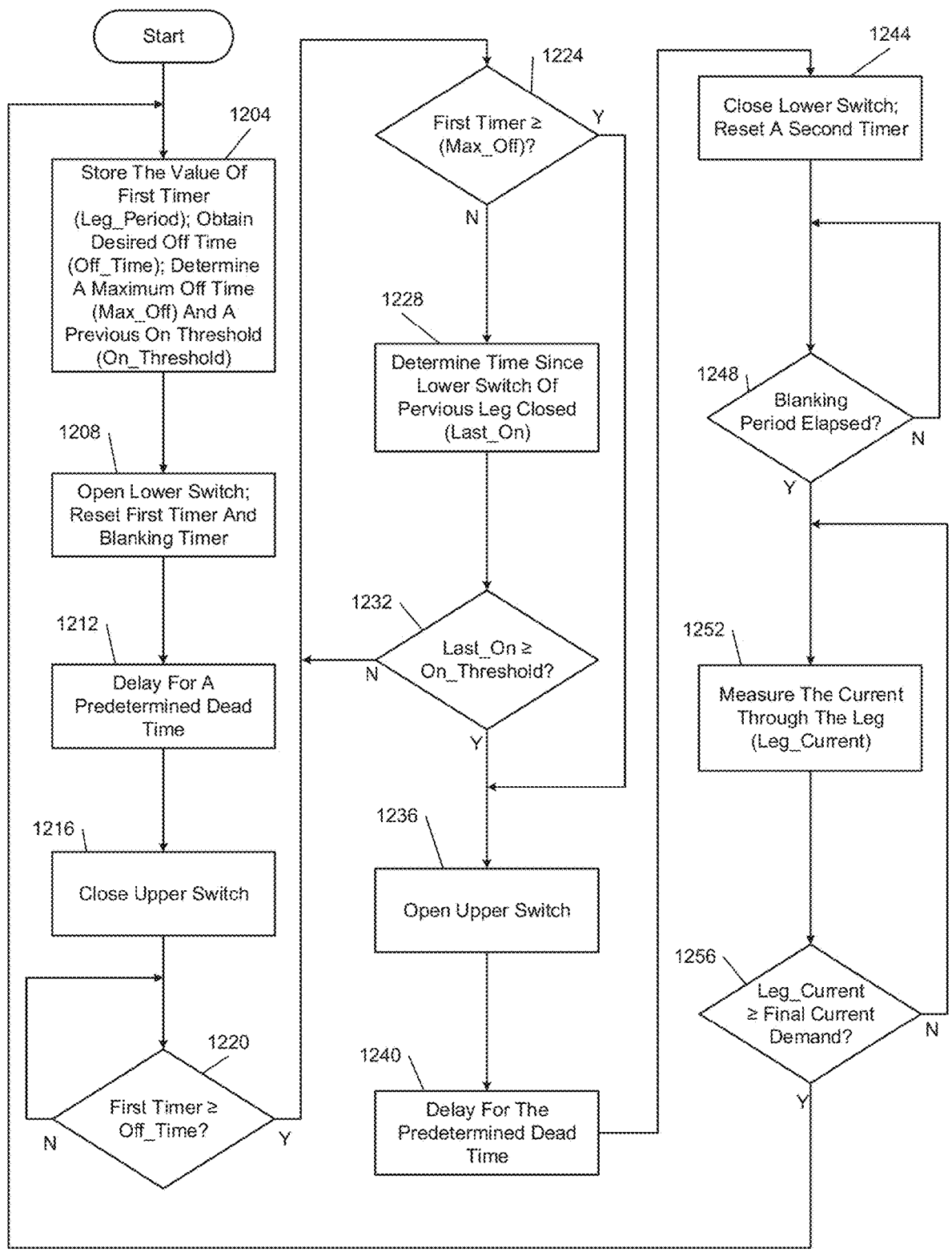
FIG. 12 is a flowchart including an example method of determining the desired OFF period of switches of a converter leg in a PFC circuit and controlling the switches based on the desired OFF period.

FIG. 12 is a flowchart that depicts an example method of controlling the lower and upper switches in a single leg of the PCF circuit 300. Although the method below is described with respect to the current control module 620 controlling the first leg 410 of the PFC circuit 300, the method may be used to control the lower and upper switches of any leg of the PFC circuit 300—for example, the first leg 410, the second leg 420, or the third leg 430. One cycle of the method may be used to control the switches of each leg. The cycles, however, may begin at different times.

Control begins with 1204 where the first switching control module 1016 stores the value of the first timer module 1032 as the period of the first leg 410 and obtains a desired off time (Off_Time) (also referred to as the desired OFF period) for the first lower switch 314. The first switching control module 1016 may obtain the desired off time from the desired OFF period module 1064. At 1204, the first switching control module 1016 also determines a maximum off time (Max_Off) for the first lower switch 314 and a previous leg ON threshold (On_Threshold) (also referred to as the previous ON delay) based on the stored period of the first leg 410. The first switching control module 1016 may set Max_Off to 17/16 of the stored period and On_Threshold to 9/32 of the stored period. Control continues with 1208.

At 1208, the first switching control module 1016 generates an output signal to open the first lower switch 314. At 1208, the current control module 620 resets the timer associated with the first timer module 1032 and the blanking timer module 1020. Control continues with 1212, where the first switching control module 1016 delays for a predetermined dead time. Control then progresses to 1216, where the first switching control module 1016 generates an output signal to close the first upper switch 328. The first switching control module 1016 delays for the predetermined dead time between opening the first lower switch 314 and closing the first upper switch 328 to prevent both the first lower switch 314 and the first upper switch 328 from being closed at the same time. Control continues with 1220.

At 1220, the first switching control module 1016 determines whether the first lower switch 314 has been off for at least the desired off time (Off_Time). For example, the first switching control module 1016 determines whether the output of the first timer module 1032 is greater than or equal to the desired off time (Off_Time). If so, control continues with 1224; otherwise, control returns to 1220.

At 1224, the first switching control module 1016 determines whether the first lower switch 314 has been off for the determined maximum off time (Max_Off). For example, the first switching control module 1016 determines whether the output of the first timer module 1032 is greater than or equal to the determined maximum off time (Max_Off). If so, control transfers to 1236, as described below; otherwise, control continues with 1228. At 1228, the first switching control module 1016 determines how much time has elapsed since the lower switch of the previous leg was turned on. In the example of the first leg, this is the third lower switch 322. For example, the first switching control module 1016 may use the output of the first ON timer module 1036 as the time since the third lower switch 322 was turned on (Last_On). At 1232, the first switching control module 1016 determines whether Last_On is greater than or equal to the determined previous on threshold (On_Threshold). If so, control continues with 1236; otherwise control returns to 1224.

At 1236, the first switching control module 1016 generates an output signal to open the first upper switch 328. Control then continues with 1240, where the first switching control module 1016 delays for the predetermined dead time. At 1244, the first switching control module 1016 generates an output signal to close the first lower switch 314 and resets a timer associated with the second ON timer module 1044. Control then continues with 1248.

At 1248, control determines whether a blanking period has elapsed since the second lower switch 318 and third lower switch 322 were turned off. For example, the first switching control module 1016 determines whether the blanking signal output by the blanking timer module 1020 is in the second state. If so, control continues with 1252; otherwise, control returns to 1248. In various implementations, 1248 can be performed between 1252 and 1256. If 1248 was false, control would return to 1252, and if 1248 was true, control would continue to 1256.

At 1252, control measures the current through the leg (Leg_Current). For example, the first comparison module 1004 may obtain the measured current through the first inductor 308 from the first current sensor 326. At 1256, control determines whether the current through the leg (Leg_Current) is greater than or equal to the final current demand. The determination of the final current demand is discussed above. If 1256 is false, control returns to 1252; otherwise, control returns to 1204. While the example of FIG. 12 is discussed with respect to one leg, the example of FIG. 12 may be performed for each leg. For example, control may return to 1204 for a next leg.

Figure 13A:
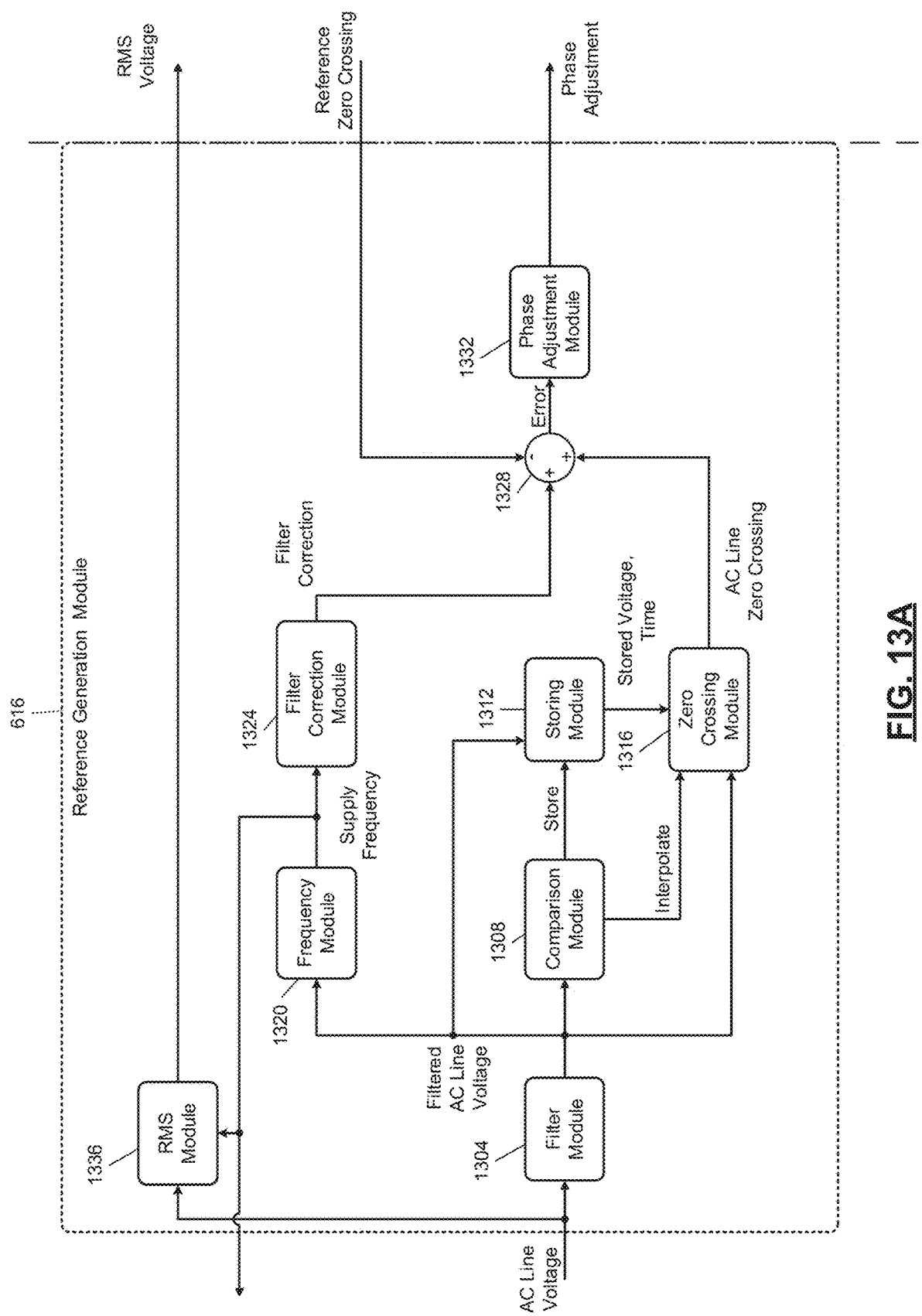
FIGS. 13A and 13B are a functional block diagram of an example implementation of a reference signal generation module.
Figure 13B:
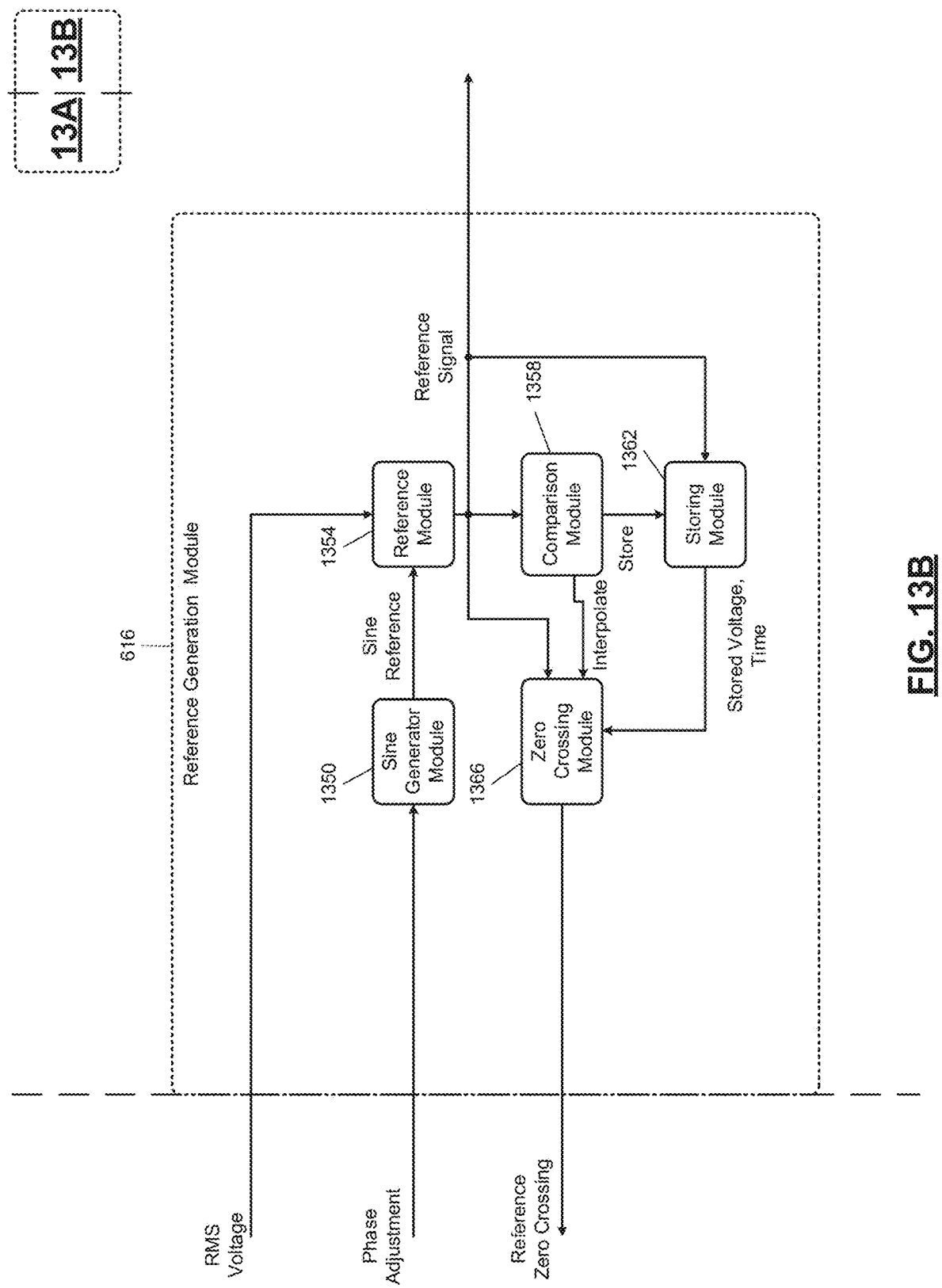

FIGS. 13A and 13B together include a functional block diagram of an example reference generation module 616. Referring now to FIG. 13A, a filter module 1304 applies a filter to the AC input voltage measured using the AC line voltage sensor to produce a filtered AC input voltage. For example only, the filter module 1304 may apply a first or second order low pass filter or another suitable type of filter.

A comparison module 1308 compares the filtered AC input voltage with a first predetermined voltage that is less than 0 (zero) V. The comparison module 1308 transitions a store signal from a second state to a first state when the filtered AC input voltage transitions from less than the first predetermined voltage to greater than the first predetermined voltage. For example only, the first predetermined voltage may be approximately −50 V or another suitable voltage that is less than 0 V.

When the store signal transitions from the second state to the first state, a storing module 1312 stores the filtered AC input voltage and a present time. The stored filtered AC input voltage and the stored time are used to determine a zero crossing of the AC input voltage. Present time may be tracked, for example, by a clock.

The comparison module 1308 also compares the filtered AC input voltage with a second predetermined voltage that is greater than 0 V. The comparison module 1308 transitions an interpolate signal from a second state to a first state when the filtered AC input voltage transitions from less than the second predetermined voltage to greater than the second predetermined voltage. For example only, the second predetermined voltage may be approximately +50 V or another suitable voltage that is greater than 0 V. While the example of first and second predetermined voltages that are symmetric about 0 V (e.g., +/−50 V), non-symmetric first and second predetermined voltages may be used or the first and second predetermined voltages may be symmetric about a voltage other than 0 V.

When the interpolate signal transitions from the second state to the first state, a zero crossing module 1316 determines an AC line zero crossing (e.g., time) based on the filtered AC input voltage at that (present) time, the present time, the stored time, and the stored filtered AC input voltage. The stored time and the stored filtered AC input voltage are provided by the storing module 1312. The zero crossing module 1316 may determine the AC line zero crossing, for example, using linear interpolation based on the filtered AC input voltage, the present time, the stored time, and the stored filtered AC input voltage. The AC line zero crossing corresponds to the time when the filtered AC input voltage crossed zero as it increased from the first predetermined voltage to the second predetermined voltage. An AC line zero crossing may be determined for each rising of the AC voltage across zero.

Figure 14:
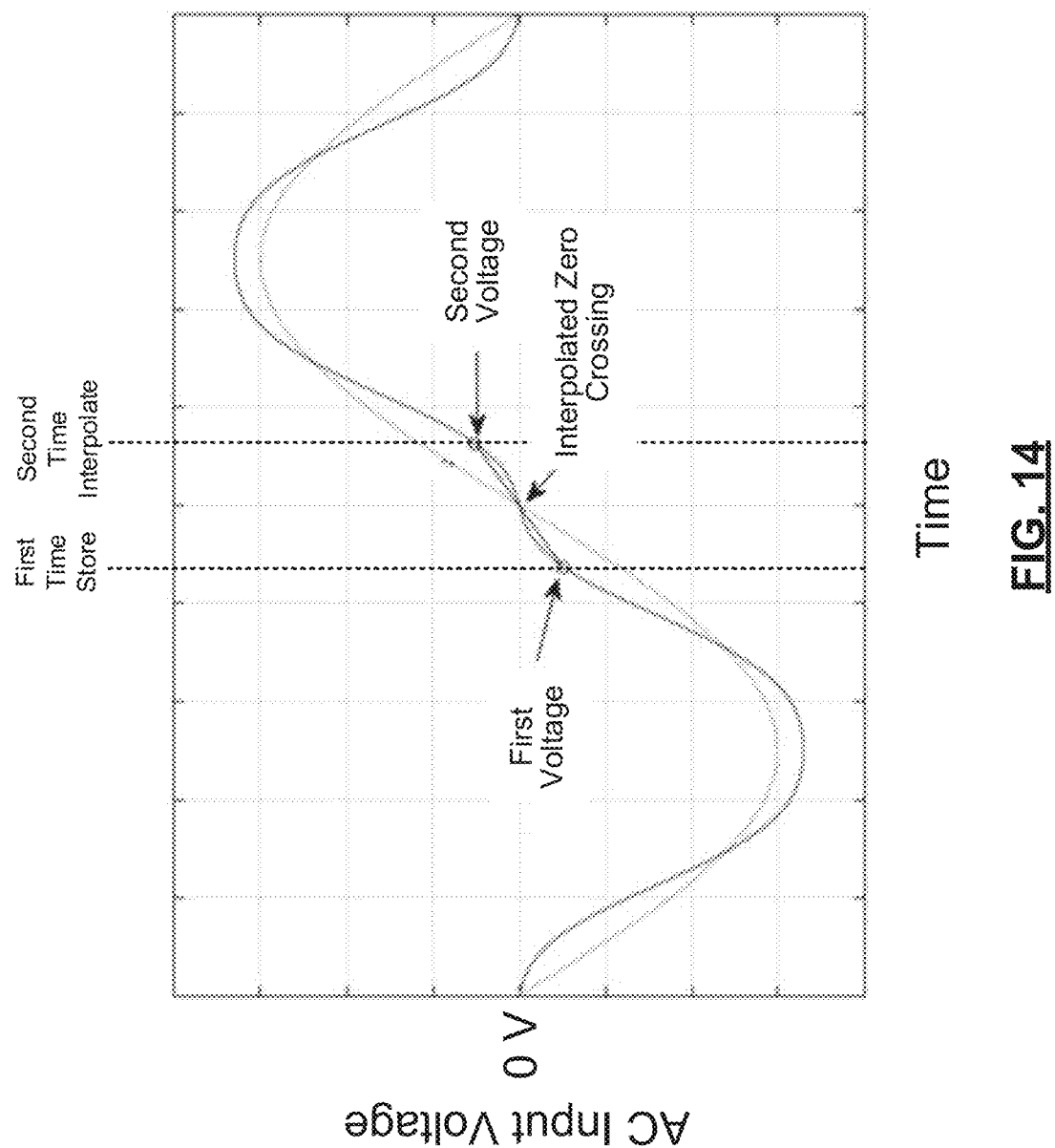
FIG. 14 includes an example graph of filtered AC input voltage versus time.

FIG. 14 includes an example graph of the filtered AC input voltage versus time. In this example, the input AC voltage (and therefore the filtered AC input voltage) are not purely sinusoidal for illustration purposes. The first voltage, the time of the first voltage (first time), the second voltage, and the time of the second voltage (second time) can be used to determine the zero crossing via linear interpolation.

Referring back to FIG. 13A, a frequency module 1320 determines the supply frequency. As discussed above, the supply frequency is used by the filter coefficients module 816 to determine the filter confidents of the notch filter. The supply frequency corresponds to the frequency of the AC input voltage. The frequency module 1320 may determine the supply frequency, for example, based on two or more values of the filtered AC input voltage. For example, the frequency module 1320 may determine the supply frequency based on the period between the filtered AC input voltages of two consecutive peaks or two consecutive zero crossings. Alternatively, the frequency module 1320 may determine the supply frequency based on the reference signal.

Figure 15:
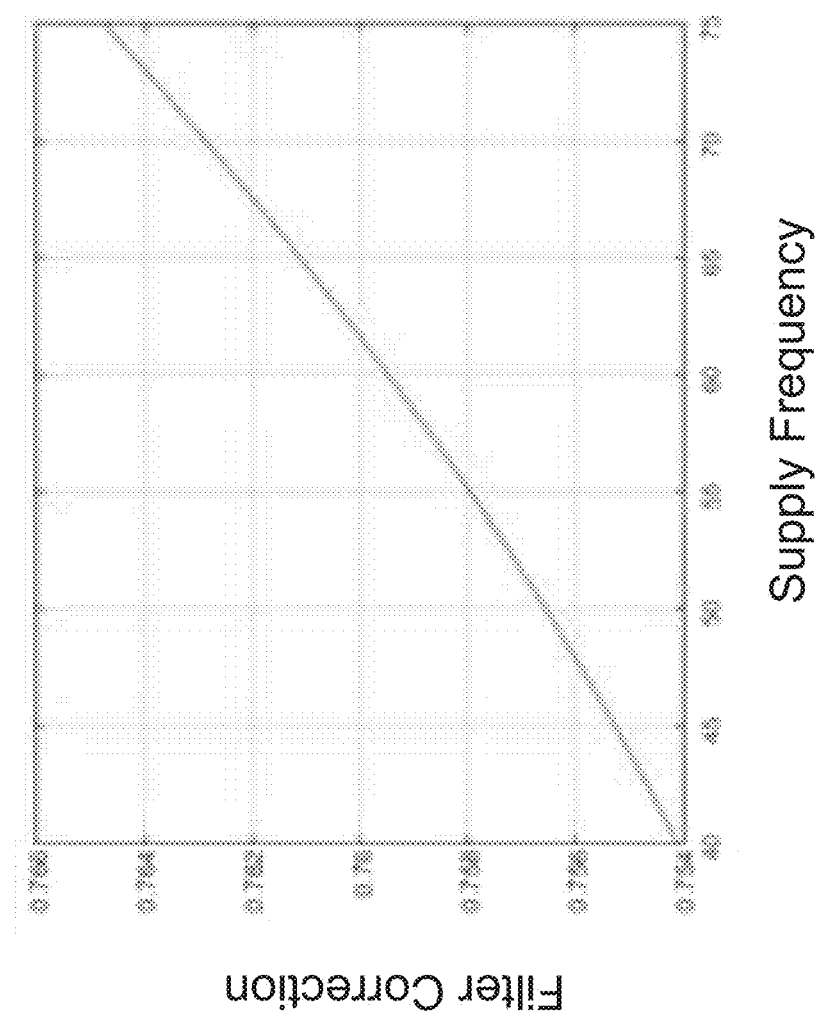
FIG. 15 includes an example graph of filter correction versus supply frequency.

The filtering performed by the filter module 1304 causes the filtered AC input voltage to be delayed relative to the AC input voltage. A filter correction module 1324 determines a filter correction for this delay based on the supply frequency. For example, the filter correction module 1324 may determine the filter correction using a function or a look-up table that relates supply frequencies to filter corrections. For values between entries of the look-up table, the filter correction module 1324 may determine the filter corrections using interpolation. FIG. 15 includes an example graph of filter correction versus supply frequency.

An error module 1328 determines an error based on a difference between the AC line zero crossing and a reference signal zero crossing. The error module 1328 may also adjust the error for the filter correction. For example, the error module 1328 may set the error based on or equal to the AC line zero crossing plus the filter correction minus the reference signal zero crossing. In various implementations, the AC line zero crossing may be adjusted based on the filter correction (e.g., summed with the filter correction), and the error module 1328 may set the error equal to or based on the (adjusted) AC line zero crossing minus the reference signal zero crossing.

A phase adjustment module 1332 determines a phase adjustment for a sine wave used to generate the reference signal based on the error. For example, the phase adjustment module 1332 may determine the phase adjustment using one of a function and a look-up table that relates errors to phase adjustments. For values between entries of the look-up table, the phase adjustment module 1332 may determine the phase adjustment using interpolation. When the error is greater than a predetermined period, such as approximately 1 period of the supply frequency, the phase adjustment module 1332 may treat the error as zero and leave the phase adjustment unchanged.

An RMS module 1336 determines an RMS (root mean squared) voltage of the AC input voltage based on the supply frequency and the AC input voltage. For example, the RMS module 1336 may determine the RMS voltage using one of a function that relates AC input voltages and supply frequencies to RMS voltages. As an example, the RMS module 1336 may determine the RMS voltage by determining an average of squares the AC input voltages obtained over one period (as indicated by the supply frequency) and set the RMS voltage based on a square root of the average. The RMS module 1336 may also multiply the RMS voltage by the square root of 2 to obtain a peak voltage. While the example of determining the RMS voltage based on the AC input voltage is provided, the filtered AC voltage may be used in place of the AC input voltage. As discussed further below, the RMS voltage (or the peak voltage) may be used to scale the reference signal such that the voltage of the reference signal corresponds to the AC input voltage.

Referring now to FIG. 13B, a sine generator module 1350 generates a sine reference signal. The sine generator module 1350 may generate the sine reference signal to form a sine wave that varies over time between +1 and −1 and that has a frequency equal to the frequency of the AC input voltage. The sine generator module 1350, however, adjusts the sine reference signal based on the phase adjustment such that zero crossings of the reference signal align with zero crossings of the AC input voltage. The sine generator module 1350 may generate the sine reference signal, for example, as described below in conjunction with 1368, 1370, and 1372 of FIG. 13D.

A reference module 1354 generates the reference signal based on the sine reference signal and the RMS voltage. For example, the reference module 1354 may set the reference signal based on or equal to the (value of the) sine reference signal multiplied by the peak voltage of the RMS voltage. The reference signal therefore varies over time with voltages corresponding to the AC input voltages and has a frequency equal to the AC input voltage.

A comparison module 1358 compares the reference signal with a third predetermined voltage that is greater than 0 (zero) V. The comparison module 1358 transitions a store signal from a second state to a first state when the reference signal transitions from greater than the third predetermined voltage to less than the third predetermined voltage. For example only, the third predetermined voltage may be approximately +50 V or another suitable voltage that is greater than 0 V. The third predetermined voltage may be the same as the second predetermined voltage.

When the store signal transitions from the second state to the first state, a storing module 1362 stores the (voltage of) the reference signal and a present time. The stored voltage of the reference signal and the stored time are used to determine a zero crossing of the reference signal.

The comparison module 1358 also compares the reference signal with a fourth predetermined voltage that is less than 0 V. The comparison module 1358 transitions an interpolate signal from a second state to a first state when the reference signal transitions from greater than the fourth predetermined voltage to less than the fourth predetermined voltage. For example only, the fourth predetermined voltage may be approximately −50 V or another suitable voltage that is less than 0 V. While the example of third and fourth predetermined voltages that are symmetric about 0 V (e.g., +/−50 V), non-symmetric third and fourth predetermined voltages may be used. The fourth predetermined voltage may be the same as the first predetermined voltage.

When the interpolate signal transitions from the second state to the first state, a zero crossing module 1366 determines a reference signal zero crossing (e.g., time) based on (e.g., voltage of) the reference signal at that (present) time, the present time, the stored time, and the stored voltage of the reference signal. The stored time and the stored voltage of the reference signal are provided by the storing module 1362. The zero crossing module 1366 may determine the reference signal zero crossing, for example, using linear interpolation based on the voltage of the reference signal, the present time, the stored time, and the stored voltage of the reference signal. The reference signal zero crossing corresponds to the time when the reference signal crossed zero V as it decreases from the third predetermined voltage to the fourth predetermined voltage. A reference signal zero crossing may be determined for each falling of the reference signal across zero.

Figure 16:
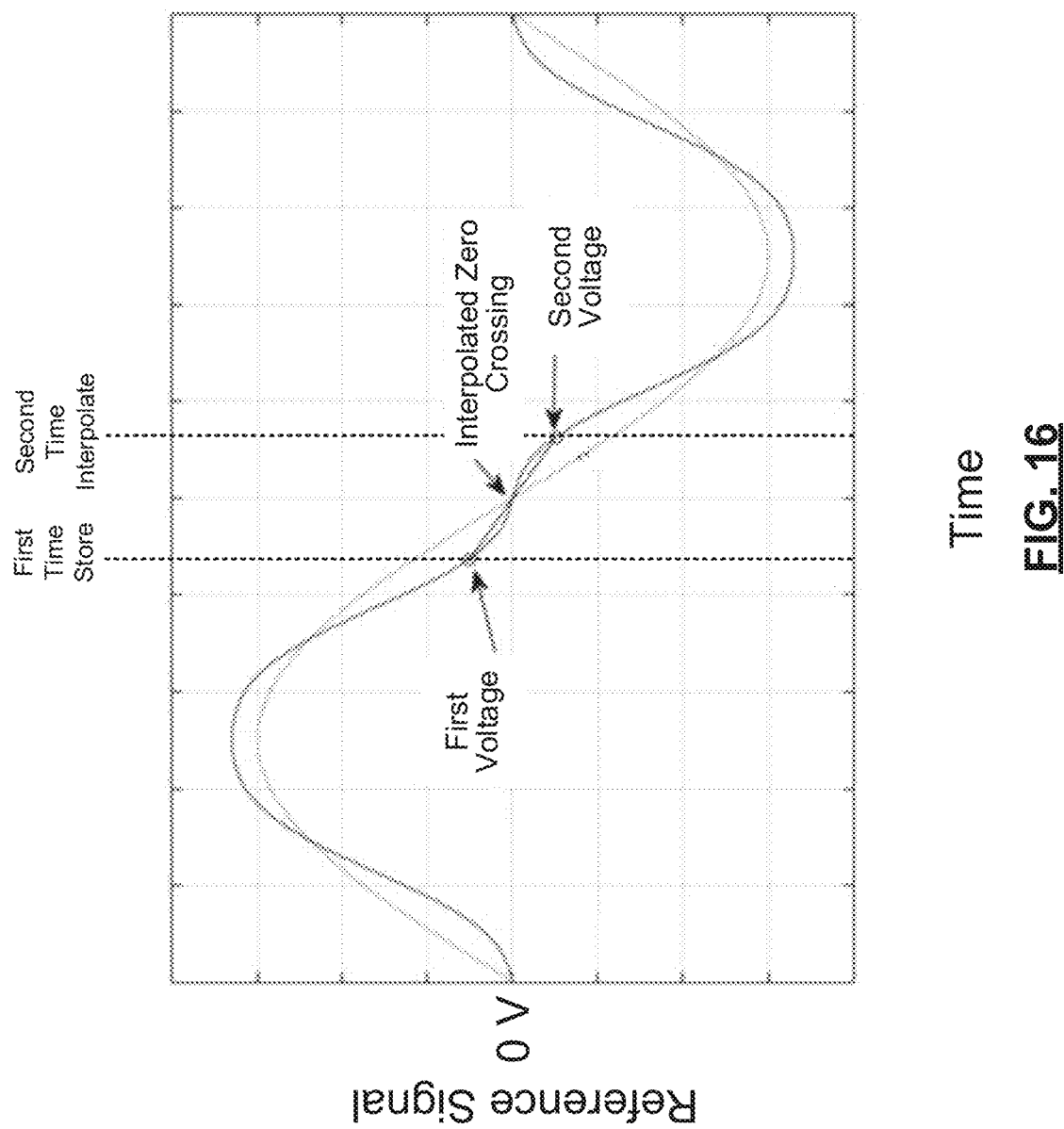
FIG. 16 includes an example graph of voltage of a reference signal versus time.

FIG. 16 includes an example graph of the voltage of the reference signal versus time. The first voltage of the reference signal, the time of the first voltage (first time), the second voltage of the reference signal, and the time of the second voltage (second time) can be used to determine the zero crossing of the reference signal via linear interpolation. While the example of determining the reference signal zero crossing using the reference signal is discussed, the sine reference signal could equally be used.

As discussed above, the reference signal zero crossing is used with the AC line zero crossing to determine the phase correction. Due to AC line zero crossings being determined based on the rising portion of the AC input voltage and reference signal zero crossings being determined based on the falling portions of the reference signal, each reference signal zero crossing should be approximately 180 degrees (½ of a period) out of phase from the AC line zero crossings that occur before and after that reference signal zero crossing.

The phase adjustment module 1332 may account for this phase difference in generating the phase adjustment. For example only, each AC line zero crossing may be adjusted based on the period corresponding to ½ of a period of the supply frequency before being used by the error module 1328. For example, the period corresponding to ½ of the period of the supply frequency may be summed with each AC line zero crossing before use by the error module 1328.

Another way to generate the reference signal is described in commonly assigned, U.S. Pat. No. 8,264,860, issued on Sep. 11, 2012, which is incorporated herein in its entirety.

Generating the reference signal as described herein, however, can be performed more slowly and consume less computational resources. Generating the reference signal as described herein may also render a better reference signal when the AC input voltage is distorted. The filtering provided by the filter module 1304 provides additional robustness. The filtering imparts delay, but this delay is compensated for by the filter correction module 1324, as described above.

Figure 13C:
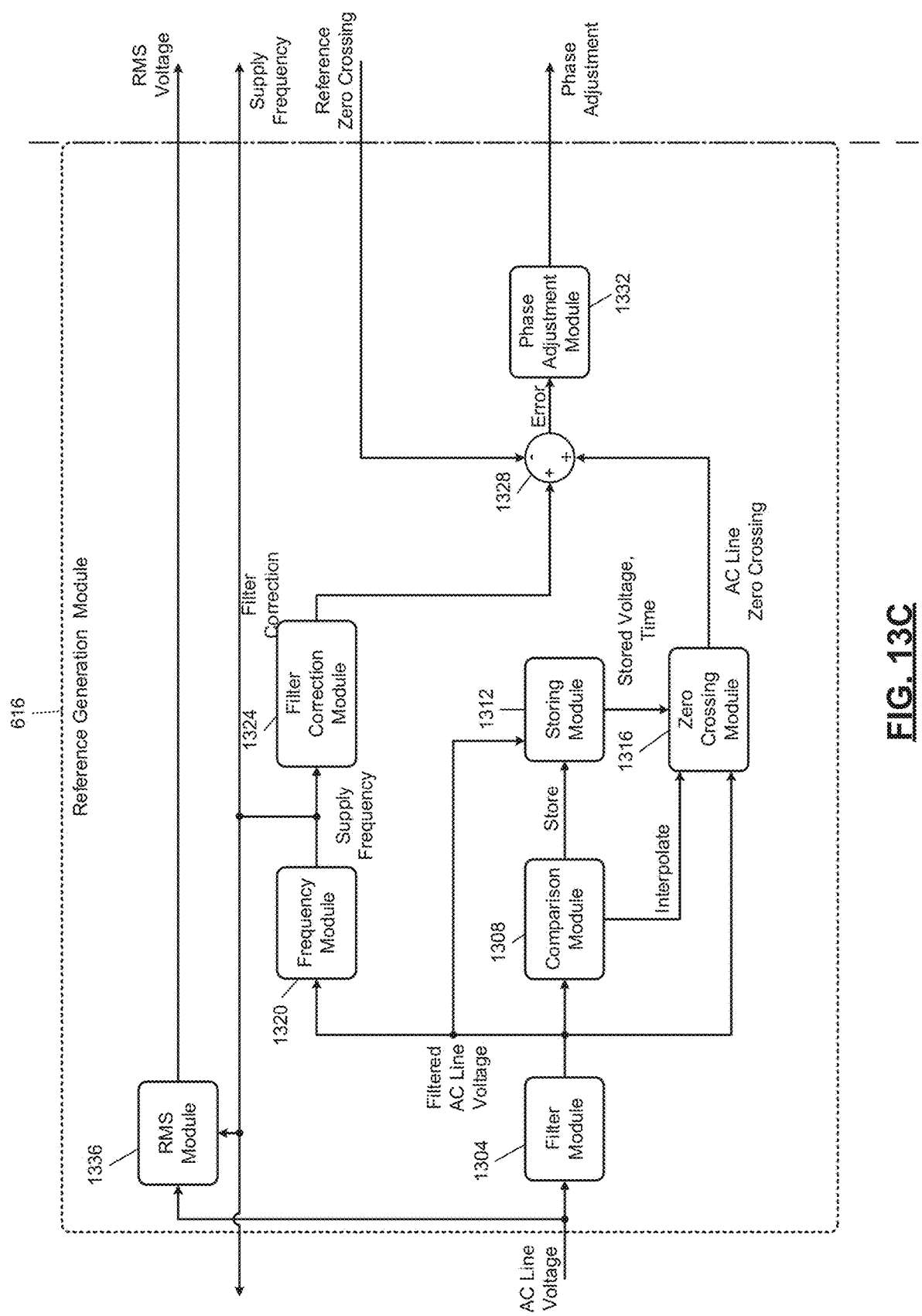
FIGS. 13C and 13D are a functional block diagram of an example implementation of a reference signal generation module.
Figure 13D:
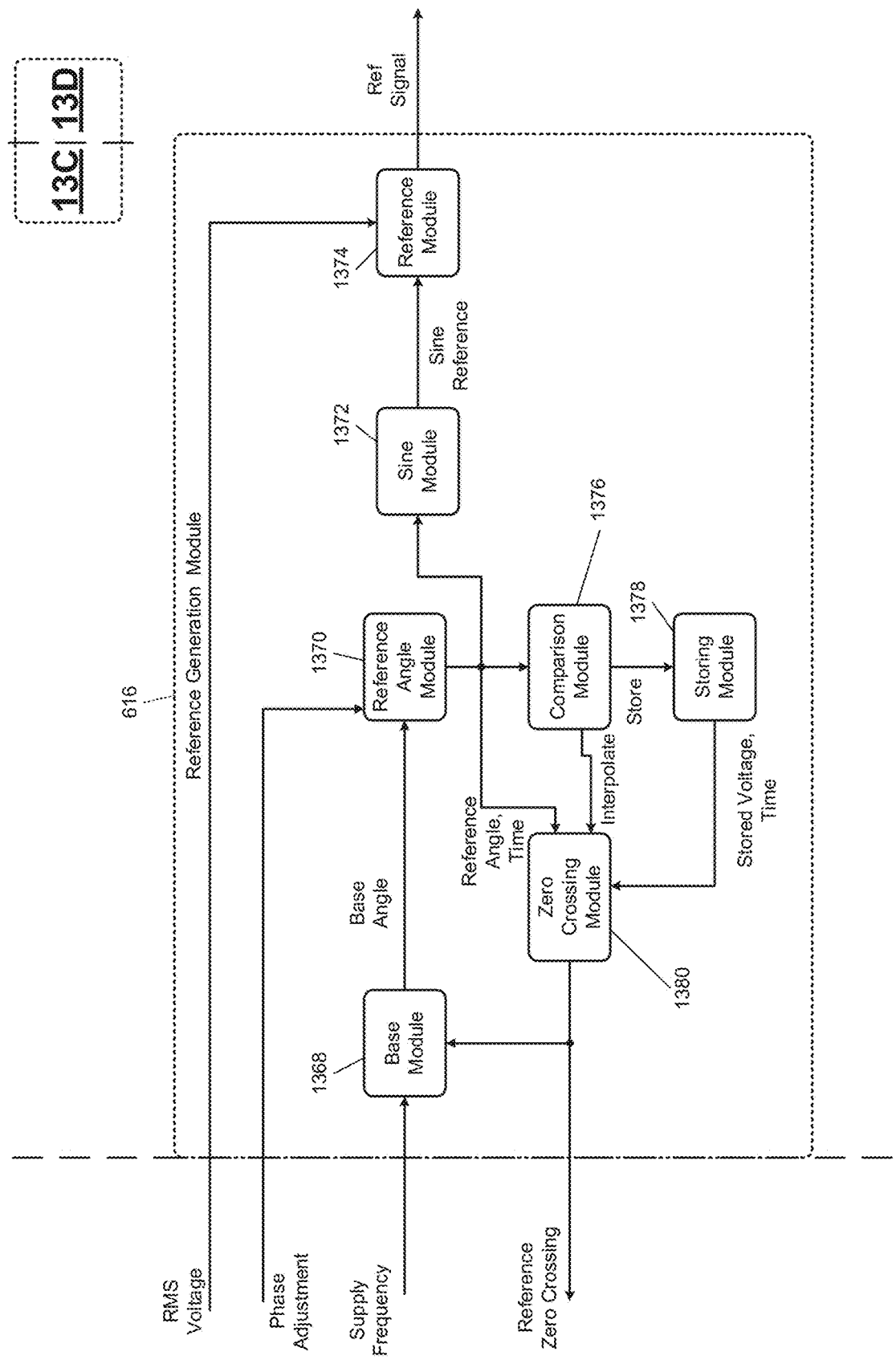

FIGS. 13C and 13D together include a functional block diagram of an example reference generation module 616. FIG. 13C includes elements that are similar to those of FIG. 13A. The reference signal zero crossing input to the error module 1328, however, is determined differently.

Referring now to FIG. 13D, a base module 1368 determines a base reference (signal) angle based on the supply frequency. The base reference angle corresponds to an angle of the reference signal (e.g., between 0 and 360 degrees, which corresponds to 1 period of the reference signal). The base module 1368 may, for example, mathematically integrate the supply frequency each control loop. The mathematical integration produces a change in the base reference angle. The base module 1368 may update the base reference angle each control loop by summing the change determined for that control loop with the base reference angle from the last control loop. In various implementations, the base module 1368 may limit the base reference angle to between 0 and a predetermined maximum value, such as 360 degrees, wrapping back to 0 when the base reference angle becomes greater than the predetermined maximum value. This may be performed, for example, using the modulo function.

A reference angle module 1370 determines a reference signal angle based on the phase adjustment and the base reference angle. For example, the reference angle module 1370 may set the reference signal angle based on or equal to the phase adjustment plus the base reference angle.

A sine module 1372 determines a sine reference signal angle as the sine (function) of the reference signal angle. As such, the sine reference signal angle varies between +1 and −1 based on the reference signal angle. A reference module 1374 generates the reference signal based on the sine reference signal angle and the RMS voltage. For example, the reference module 1374 may set the reference signal based on or equal to the (value of the) sine reference signal angle multiplied by the peak voltage of the RMS voltage. The reference signal therefore varies over time with voltages corresponding to the AC input voltages and has a frequency equal to the AC input voltage.

A comparison module 1376 compares the reference signal angle with a first predetermined angle. The comparison module 1376 transitions a store signal from a second state to a first state when the reference signal angle transitions from less than the first predetermined angle to greater than the first predetermined angle. For example only, the first predetermined angle may be approximately 150 degrees or another suitable angle before an expected zero crossing of the reference signal (e.g., 180 degrees).

When the store signal transitions from the second state to the first state, a storing module 1378 stores the reference signal angle and a present time. The stored reference angle and the stored time are used to determine a zero crossing of the reference signal.

The comparison module 1376 also compares the reference angle with a second predetermined angle. The comparison module 1376 transitions an interpolate signal from a second state to a first state when the reference angle transitions from less than the second predetermined angle to greater than the second predetermined angle. For example only, the second predetermined angle may be approximately 210 degrees or another suitable angle after an expected zero crossing of the reference signal (e.g., 180 degrees). While the example of first and second predetermined angles that are symmetric about 180 degrees is provided, other non-symmetric predetermined angles and other predetermined angles may be used.

When the interpolate signal transitions from the second state to the first state, a zero crossing module 1380 determines a reference signal zero crossing (e.g., time) based on the reference signal angle at the present time, the stored time, and the stored reference signal angle. The stored time and the stored reference signal angle are provided by the storing module 1378. The zero crossing module 1380 may determine the reference signal zero crossing, for example, using linear interpolation based on the reference signal angle, the present time, the stored time, and the stored reference signal angle. The reference signal zero crossing corresponds to the time when the reference signal crossed zero V as the reference signal decreased. A reference signal zero crossing may be determined for each falling of the reference signal across zero.

Figure 13E:
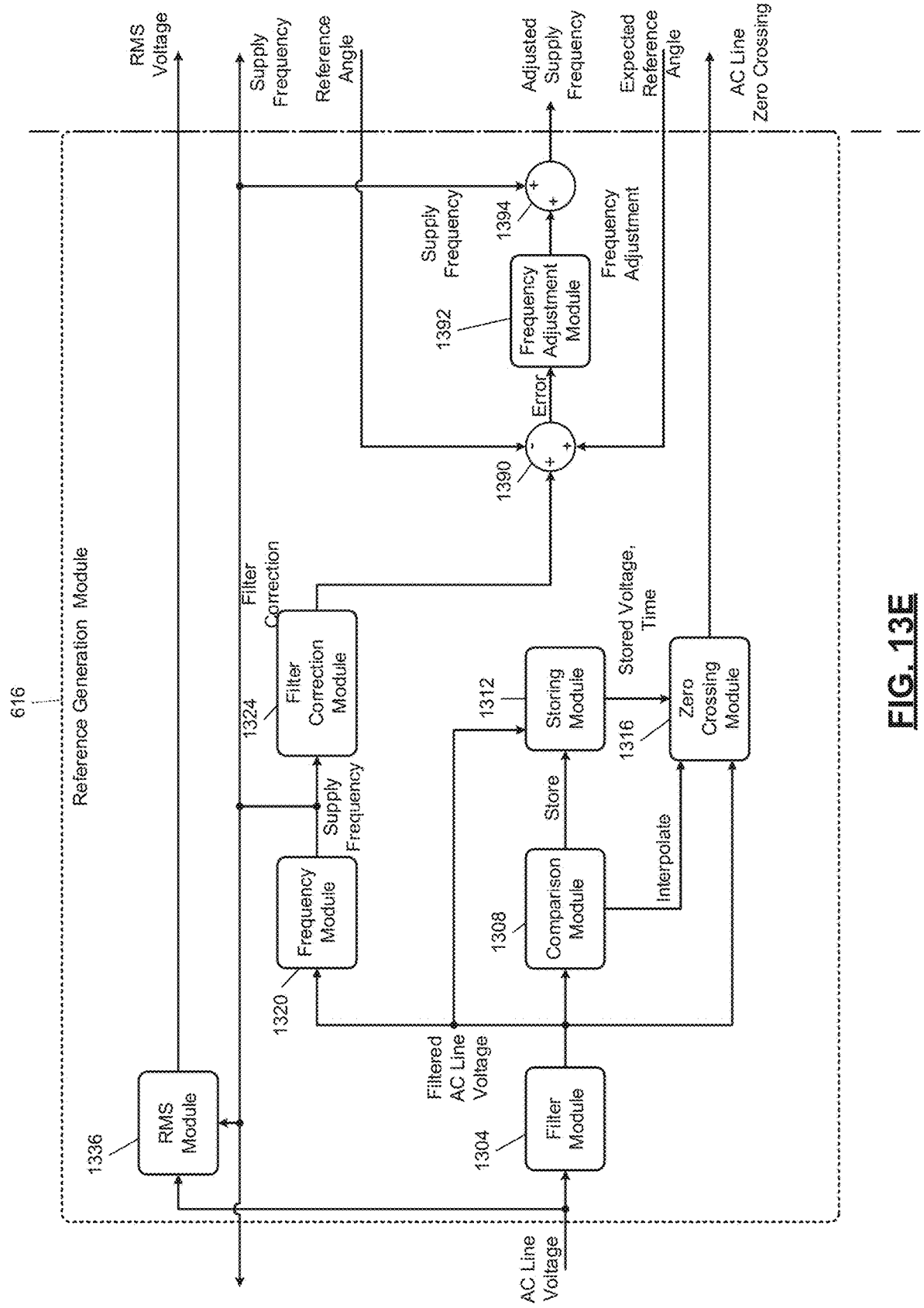
FIGS. 13E and 13F are a functional block diagram of an example implementation of a reference signal generation module.
Figure 13F:
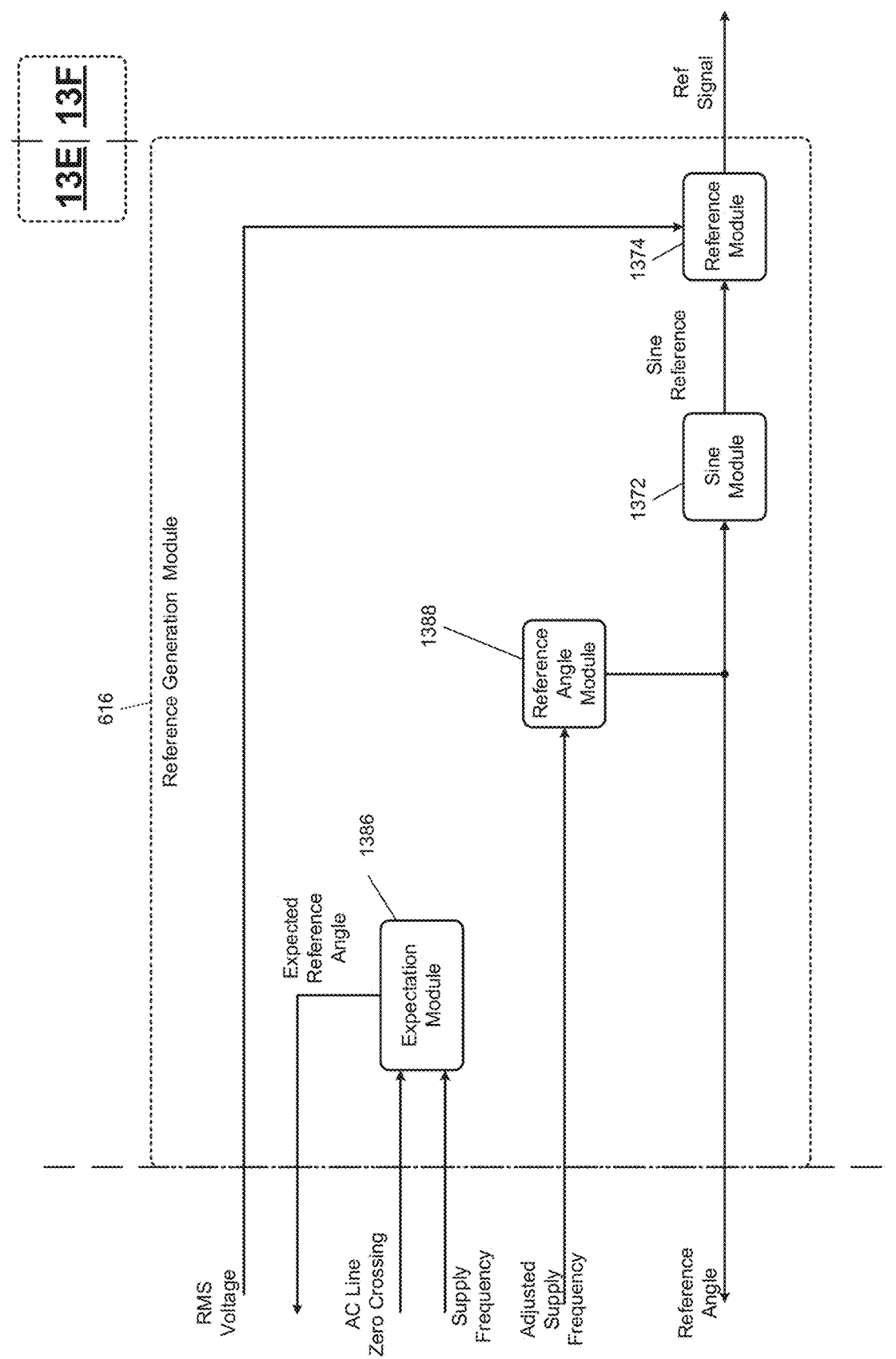

FIGS. 13E and 13F together include a functional block diagram of an example reference generation module 616. In the example of FIGS. 13E and 13F, the AC line zero crossing is used to determine an expected reference angle. In the example of FIGS. 13E and 13F, the reference signal zero crossing is not determined.

Referring to FIG. 13F, an expectation module 1386 determines an expected reference signal angle. The expected reference signal angle at a given time corresponds to an expected value of the reference signal angle at that time. The expectation module 1386 determines the expected reference signal angle based on the AC line zero crossing and the supply frequency. For example, the expectation module 1386 may set the expected reference signal angle to zero at each AC line zero crossing. The expectation module 1386 may mathematically integrate the supply frequency each control loop. The mathematical integration produces a change in the expected reference signal angle. The expectation module 1386 may update the expected reference signal angle each control loop by summing the change determined for that control loop with the expected reference signal angle from the last control loop. In various implementations, the expectation module 1386 may limit the expected reference signal angle to between 0 and a predetermined maximum value, such as 360 degrees, wrapping back to 0 when the expected reference signal angle becomes greater than the predetermined maximum value. This may be performed, for example, using the modulo function. The expected reference signal angle is discussed further below.

A reference angle module 1388 determines a base reference (signal) angle based on an adjusted supply frequency. Generation of the adjusted supply frequency is discussed further below with respect to FIG. 13E. The reference angle module 1388 may, for example, determine a change in the reference signal angle based on a period between consecutive determinations of the base reference signal angle and the adjusted supply frequency. The reference angle module 1388 may, for example, mathematically integrate the adjusted supply frequency each control loop. The mathematical integration produces a change in the base reference angle. The reference angle module 1388 may update the base reference angle each control loop by summing the change determined for that control loop with the base reference angle from the last control loop. In various implementations, the reference angle module 1388 may limit the base reference angle to between 0 and a predetermined maximum value, such as 360 degrees, wrapping back to 0 when the base reference angle becomes greater than the predetermined maximum value. This may be performed, for example, using the modulo function. The sine module 1372 and the reference module 1374 are discussed above and are used to generate the reference signal.

Referring to FIG. 13E, an error module 1390 determines an angle error based on the filter correction (from the filter correction module 1324), the expected reference signal angle (determined by the expectation module 1386), and the reference angle (determined by the reference angle module 1388). For example only, the error module 1390 may set the angle error based on or equal to the expected reference angle minus the reference signal angle plus the filter correction.

A frequency adjustment module 1392 determines a frequency adjustment based on the error. For example, the frequency adjustment module 1392 may increase the frequency adjustment as the error increases and decrease the frequency adjustment as the error decreases. An adjusting module 1394 adjusts the supply frequency based on the frequency adjustment to determine the adjusted supply frequency. For example, the adjusting module 1394 may set the adjusted supply frequency based on or equal to the supply frequency plus the frequency adjustment. Based on the above, the reference signal will be adjusted to correspond to the AC line voltage in frequency and phase.

Figure 17:
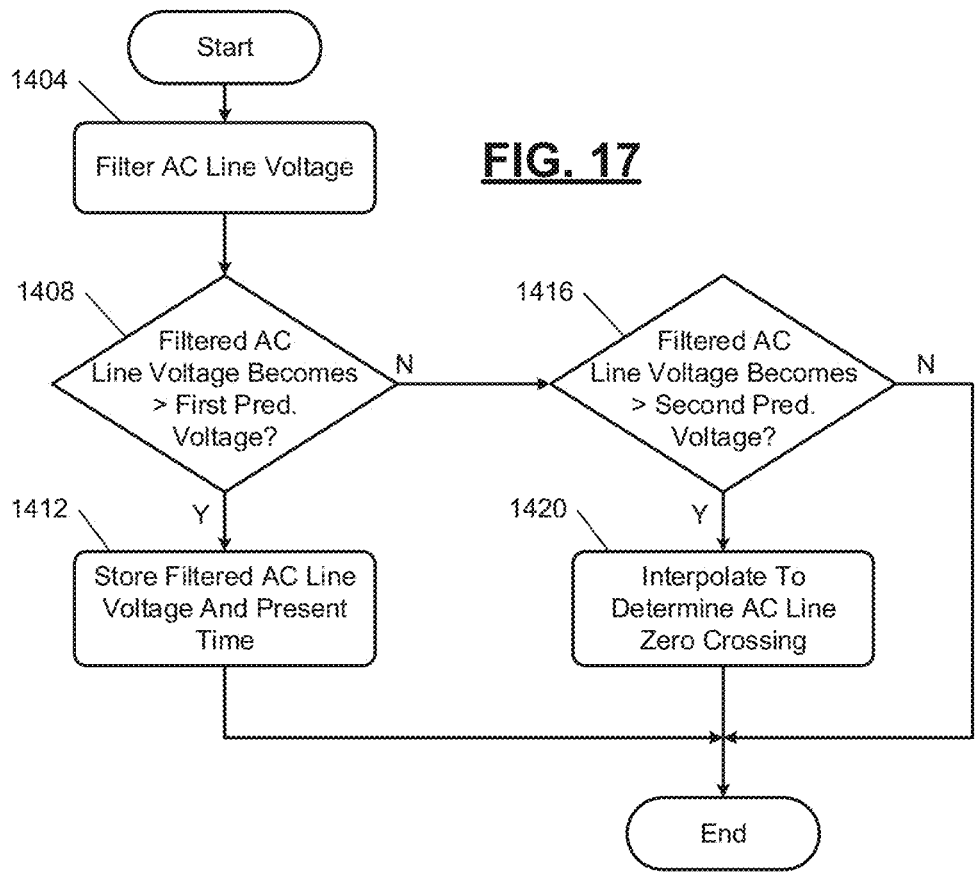
FIG. 17 is a flowchart depicting an example method of determining an AC line zero crossing.

FIG. 17 is a flowchart depicting an example method of determining an AC line zero crossing, for example based on the example of FIG. 13A-13B. Control begins with 1404 where the filter module 1304 filters the AC input voltage to produce a filtered AC input voltage. For example only, the filter module 1304 may apply a low pass filter. At 1408, the comparison module 1308 determines whether the filtered AC input voltage has transitioned from less than the first predetermined voltage (e.g., −50 V) to greater than the first predetermined voltage. If 1408 is true, the storing module 1312 stores the filtered AC input voltage and the present time at 1412, and control ends. If 1408 is false, control transfers to 1416.

At 1416, the comparison module 1308 determines whether the filtered AC input voltage has transitioned from less than the second predetermined voltage (e.g., +50 V) to greater than the second predetermined voltage. If 1416 is true, the zero crossing module 1316 determines the AC line zero crossing (as the filtered AC input voltage increased from the first predetermined voltage toward the second predetermined voltage) at 1420 based on the stored filtered AC input voltage, the present filtered AC input voltage, the stored time, and the present time using linear interpolation. Control then ends. If 1416 is false, control ends. While control is shown as ending, the example of FIG. 17 is illustrative of one control loop and control may return to 1404 for a next control loop. Also, while the example of interpolating once when the filtered AC voltage transitions to greater than the second predetermined voltage has been described, the zero crossing module 1316 may perform the interpolation based on the present filtered AC voltage for each control loop and determine the AC line zero crossing based on the interpolation at the time when the filtered AC input voltage has transitioned to greater than the second predetermined voltage.

Figure 18:
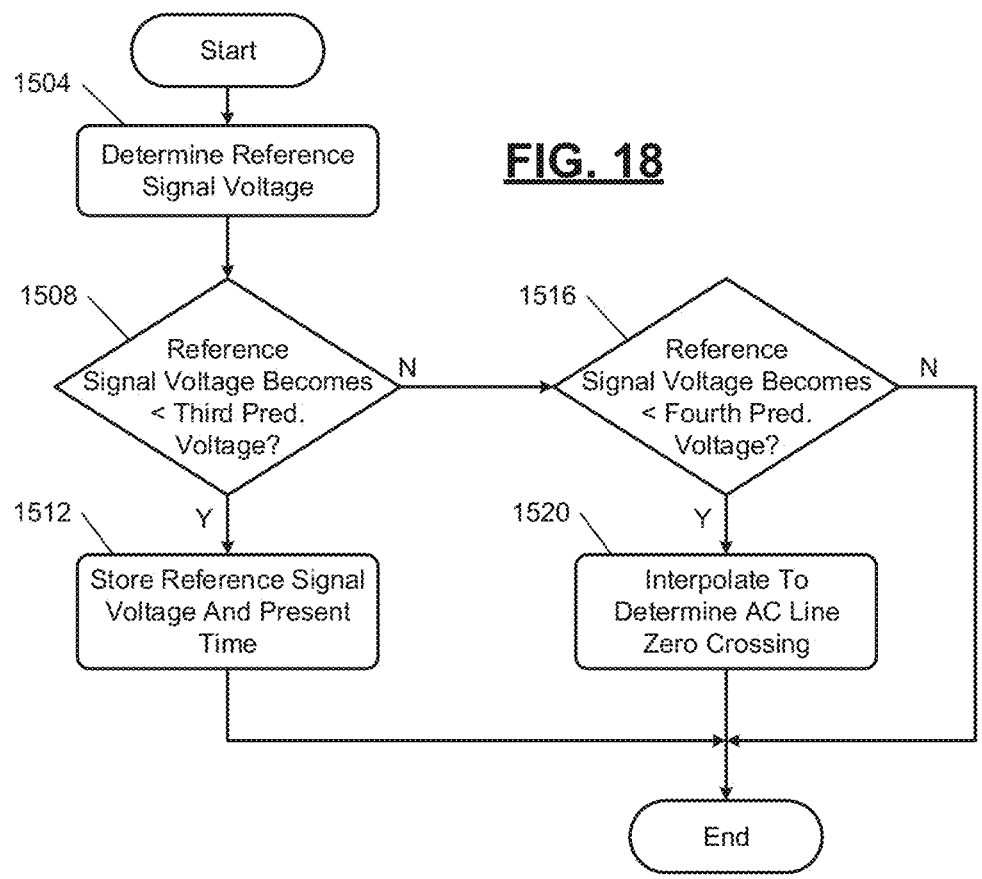
FIG. 18 is a flowchart depicting an example method of determining a reference signal zero crossing.

FIG. 18 is a flowchart depicting an example method of determining a reference signal zero crossing, for example based on the example of FIG. 13A-13B. Control begins with 1504 where the reference module 1354 generates the reference signal (voltage) based on the RMS voltage multiplied with the sine reference signal (value). At 1508, the comparison module 1358 determines whether the voltage of the reference signal has transitioned from greater than the third predetermined voltage (e.g., +50 V) to less than the third predetermined voltage. If 1508 is true, the storing module 1362 stores the reference signal voltage and the present time at 1512, and control ends. If 1508 is false, control transfers to 1516.

At 1516, the comparison module 1358 determines whether the voltage of the reference signal has transitioned from greater than the fourth predetermined voltage (e.g., −50 V) to less than the fourth predetermined voltage. If 1516 is true, the zero crossing module 1366 determines the reference signal zero crossing (as the reference signal decreased from the third predetermined voltage toward the fourth predetermined voltage) at 1520 based on the stored reference signal voltage, the present voltage of the reference signal, the stored time, and the present time using linear interpolation. Control then ends. If 1516 is false, control ends. While control is shown as ending, the example of FIG. 18 is illustrative of one control loop and control may return to 1504 for a next control loop. The example of FIG. 18 may be performed concurrently with the example of FIG. 17. Also, while the example of interpolating once when the voltage of the reference signal transitions to less than the fourth predetermined voltage has been described, the zero crossing module 1366 may perform the interpolation based on the present voltage of the reference signal for each control loop and determine the reference signal zero crossing based on the interpolation at the time when the present voltage has transitioned to less than the fourth predetermined voltage.

Figure 19:
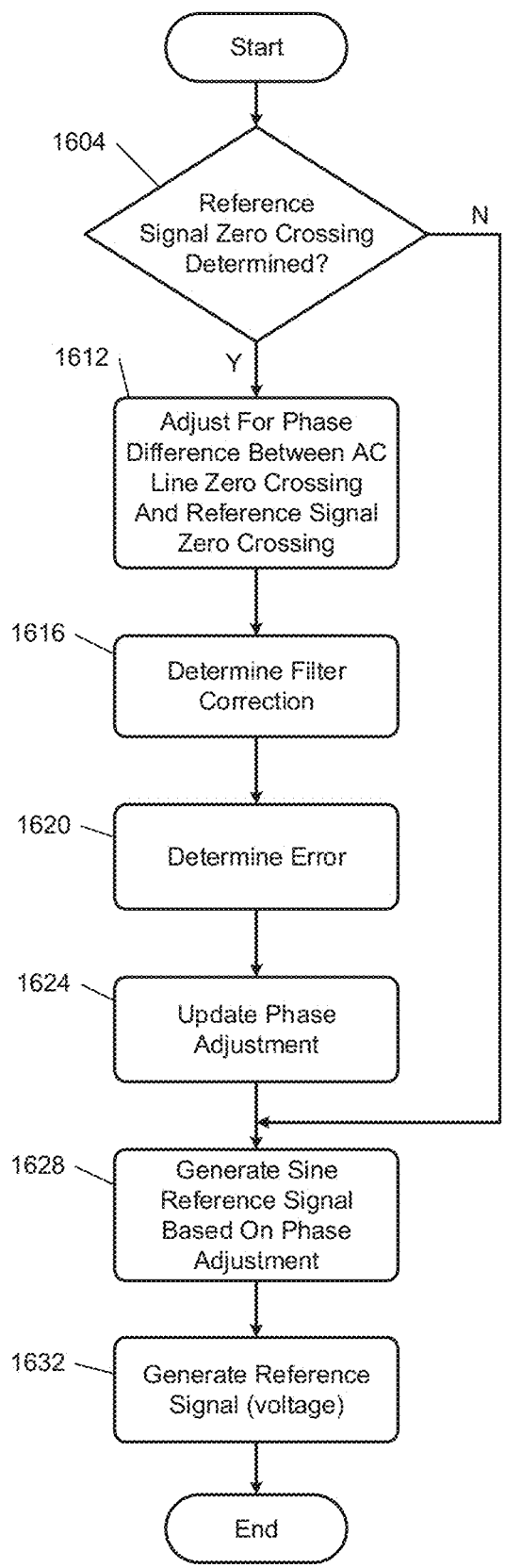
FIG. 19 is a flowchart depicting an example method of generating the reference signal.

FIG. 19 is a flowchart depicting an example method of generating the reference signal, for example based on the example of FIG. 13A-13B. Control may begin with 1604 where the sine generator module 1350 may determine whether the zero crossing module 1366 has just determined the reference signal zero crossing. For example, the zero crossing module 1366 may signal such a determination to the sine generator module 1350 or the sine generator module 1350 may determine that the zero crossing module 1366 determined the reference signal zero crossing when the reference signal zero crossing changes. If 1604 is false, control may transfer to 1628, which is discussed further below. If 1604 is true, control may continue with 1612.

At 1612, control makes one or more adjustments to account for the approximately ½ of one period (e.g., 1/supply frequency) difference between the AC line zero crossing and the reference signal zero crossing. For example, the zero crossing module 1316 may add ½ of one period of the AC input voltage to the AC line zero crossing, or the zero crossing module 1366 may subtract ½ of one period of the AC input voltage from the reference signal zero crossing. At 1616, the filter correction module 1324 determines the filter correction based on the supply frequency. The filter correction corresponds to the delay period imposed by the filter module 1304.

At 1620, the error module 1328 determines an error between the (last determined) AC line zero crossing and the (just determined) reference signal zero crossing. For example, the error module 1328 may set the error based on or equal to the AC line zero crossing plus the filter correction minus the reference signal zero crossing. The phase adjustment module 1332 updates the phase adjustment at 1624 based on the error. For example, the phase adjustment module 1332 may determine the phase adjustment using a function or a look-up table that relates errors to phase adjustments.

At 1628, the sine generator module 1350 generates a next value of the sine reference signal for generating a sine wave over the next period based on the phase adjustment. The reference module 1354 generates the next voltage of the reference signal based on the value of the sine reference signal and the RMS voltage (of the AC line) at 1632. For example, the reference module 1354 may set the voltage of the reference signal based on or equal to the value of the sine reference signal multiplied with the peak voltage of the RMS voltage. The RMS module 1336 determines the RMS voltage based on the AC input voltage, such as at 1628. The RMS module 1336 may set the peak voltage based on or equal to the RMS voltage multiplied by the square root of 2.

While control is shown as ending, the example of FIG. 19 is illustrative of one control loop and control may return to 1604 for a next control loop. The example of FIG. 19 may be performed concurrently with the examples of FIGS. 17 and 18. Also, while the example of updating the phase adjustment when the reference signal zero crossing is determined, the phase adjustment could be additionally or alternatively updated when the AC line zero crossing is determined using that AC line zero crossing and the last reference signal zero crossing (from approximately ½ of one period earlier). While FIGS. 17-19 are discussed in conjunction with the examples of FIGS. 13A-13B, similar concepts are applicable to the examples of FIGS. 13C-13D and FIGS. 13E-13F.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A power factor correction (PFC) system comprising:
a desired OFF period module configured to determine a desired OFF period for a plurality of switches of a PFC circuit based on an input voltage to the PFC circuit and an output voltage of the PFC circuit;
a blanking timer module configured to output a blanking signal, to set the blanking signal to a first state when a countdown timer is greater than zero, and to set the blanking signal to a second state when the countdown timer reaches zero; and
a switching control module configured to:
transition a first switch of the plurality of switches from an ON state to an OFF state in response to (i) a measured current through an inductor of the PFC circuit being greater than a demanded current through the inductor and (ii) the blanking signal being in the second state; and
maintain the first switch of the plurality of switches in the OFF state for at least the desired OFF period after the transition from the ON state to the OFF state.

2. The PFC system of claim 1 wherein the desired OFF period module is configured to set the desired OFF period using one of:
(i) an equation that relates input voltages and output voltages to desired OFF periods; and
(ii) a look-up table that relates input voltages and output voltages to desired OFF periods.

3. The PFC system of claim 1 wherein the desired OFF period module is configured to set the desired OFF period using the equation:

$$DOP = t_p * \frac{V_I}{V_O},$$

where DOP is the desired OFF period, $t_p$ is a predetermined switching period, $v_i$ is the input voltage, and $v_o$ is the output voltage.

4. The PFC system of claim 1 further comprising a first timer module configured to output a first time representative of a first period that the first switch of the plurality of switches has been in the OFF state, wherein:
the switching control module is configured to:
determine a maximum off period for the first switch of the plurality of switches based on an OFF period of a converter leg associated with the first switch of the plurality of switches, and
in response to determining that the first time is greater than or equal to (i) the desired OFF period and (ii) the maximum off period, transition the first switch of the plurality of switches from the OFF state to the ON state.

5. The PFC system of claim 4 further comprising a second timer module configured to output a second time representative of a second period that has passed since a second switch of the plurality of switches was transitioned from the OFF state to the ON state,
wherein the switching control module is configured to:
determine a threshold value associated with the second switch of the plurality of switches based on the OFF period of the converter leg, and
in response to determining that (i) the first time is greater than or equal to the desired OFF period and (ii) the second time is greater than or equal to the determined threshold value, transition the first switch of the plurality of switches from the OFF state to the ON state.

6. The PFC system of claim 5 wherein the switching control module is configured to, in response to transitioning the first switch of the plurality of switches from the ON state to the OFF state, delay for a predetermined dead time and, once the predetermined dead time has passed, transition a third switch of the plurality of switches from the OFF state to the ON state.

7. The PFC system of claim 6 wherein transitioning the first switch of the plurality of switches from the OFF state to the ON state includes:
transitioning a third switch of the plurality of switches from the ON state to the OFF state; and
delaying for the predetermined dead time,
after the predetermined dead time has passed, transitioning the first switch of the plurality of switches from the OFF state to the ON state.

8. The PFC system of claim 5 wherein the blanking timer module is configured to reset the countdown timer in response to one of:
the first switch of the plurality of switches transitioning from the ON state to the OFF state; and
the second switch of the plurality of switches transitioning from the ON state to the OFF state.

9. The PFC system of claim 4 wherein the switching control module is configured to, in response to the measured current through the inductor of the PFC circuit being greater than the demanded current through the inductor, store the first time output by the first timer module as the OFF period of the converter leg.

10. The PFC system of claim 1 wherein the desired OFF period module is configured to determine the desired OFF period based on a switching period associated with the first switch of the plurality of switches.

11. A power factor correction (PFC) method comprising:
determining a desired OFF period for a plurality of switches of a PFC circuit based on an input voltage to the PFC circuit and an output voltage of the PFC circuit;
outputting a blanking signal;
setting the blanking signal to a first state when a countdown timer is greater than zero;
setting the blanking signal to a second state when the countdown timer reaches zero;
transitioning a first switch of the plurality of switches from an ON state to an OFF state in response to (i) a measured current through an inductor of the PFC circuit being greater than a demanded current through the inductor and (ii) the blanking signal being in the second state; and
maintaining the first switch of the plurality of switches in the OFF state for at least the desired OFF period after the transition from the ON state to the OFF state.

12. The PFC method of claim 11 wherein setting the desired OFF period includes setting the desired OFF period using one of:
(i) an equation that relates input voltages and output voltages to desired OFF periods; and
(ii) a look-up table that relates input voltages and output voltages to desired OFF periods.

13. The PFC method of claim 11 setting the desired OFF period includes setting the desired OFF period using the equation:

$$DOP = t_p * \frac{V_I}{V_O},$$

where DOP is the desired OFF period, $t_p$ is a predetermined switching period, $v_i$ is the input voltage, and $v_o$ is the output voltage.

14. The PFC method of claim 11 further comprising:
outputting a first time representative of a first period that the first switch of the plurality of switches has been in the OFF state;
determining a maximum off period for the first switch of the plurality of switches based on an OFF period of a converter leg associated with the first switch of the plurality of switches; and
in response to determining that the first time is greater than or equal to (i) the desired OFF period and (ii) the maximum off period, transitioning the first switch of the plurality of switches from the OFF state to the ON state.

15. The PFC method of claim 14 further comprising:
outputting a second time that represents a second period that has passed since a second switch of the plurality of switches was transitioned from the OFF state to the ON state;
determining a threshold value associated with the second switch of the plurality of switches based on the OFF period of the converter leg; and
in response to determining that (i) the first time is greater than or equal to the desired OFF period and (ii) the second time is greater than or equal to the determined threshold value, transitioning the first switch of the plurality of switches from the OFF state to the ON state.

16. The PFC method of claim 15 further comprising, in response to transitioning the first switch of the plurality of switches from the ON state to the OFF state, delaying for a predetermined dead time and, once the predetermined dead time has passed, transitioning a third switch of the plurality of switches from the OFF state to the ON state.

17. The PFC method of claim 16 wherein transitioning the first switch of the plurality of switches from the OFF state to the ON state includes:
transitioning a third switch of the plurality of switches from the ON state to the OFF state; and
delaying for the predetermined dead time,
after the predetermined dead time has passed, transitioning the first switch of the plurality of switches from the OFF state to the ON state.

18. The PFC method of claim 15 further comprising resetting the countdown timer in response to one of:
the first switch of the plurality of switches transitioning from the ON state to the OFF state; and
the second switch of the plurality of switches transitioning from the ON state to the OFF state.

19. The PFC method of claim 14 further comprising, in response to the measured current through the inductor of the PFC circuit being greater than the demanded current through the inductor, storing the first time output as the OFF period of the converter leg.

20. The PFC method of claim 11 further comprising determining the desired OFF period based on a switching period associated with the first switch of the plurality of switches.

* * * * *